US010184025B2

(12) United States Patent
Ichikawa et al.

(10) Patent No.: US 10,184,025 B2
(45) Date of Patent: *Jan. 22, 2019

(54) METHODS FOR PREPARING AQUEOUS SUSPENSION OF PRECIOUS METAL NANOPARTICLES

(71) Applicant: IMRA AMERICA, INC., Ann Arbor, MI (US)

(72) Inventors: Yuki Ichikawa, Aichi (JP); Andrius Marcinkevicus, Saline, MI (US); Masayuki Ito, Cupertino, CA (US); Wei Qian, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,773

(22) Filed: Jan. 23, 2014

(65) Prior Publication Data
US 2014/0213807 A1 Jul. 31, 2014

Related U.S. Application Data

(60) Provisional application No. 61/756,622, filed on Jan. 25, 2013.

(51) Int. Cl.
*B01J 13/00* (2006.01)
*C08G 65/328* (2006.01)
*B82Y 30/00* (2011.01)

(52) U.S. Cl.
CPC ........ *C08G 65/328* (2013.01); *B01J 13/0043* (2013.01); *B82Y 30/00* (2013.01)

(58) Field of Classification Search
CPC .... C08G 65/328; B01J 13/0043; B82Y 30/00; C07F 1/08; C07F 1/10; C07F 1/12
(Continued)

(56) References Cited

U.S. PATENT DOCUMENTS 8,246,714 B2  8/2012 Liu et al.
2003/0146019 A1  8/2003 Hirai
(Continued)

FOREIGN PATENT DOCUMENTS

JP  2003156839 A  5/2003
JP  2004143571 A  5/2004
(Continued)

OTHER PUBLICATIONS

Šišková et al, Ion-Specific Effects on Laser Ablation of Silver in Aqueous Electrolyte Solutions, The Journal of Physical Chemistry C (2008), 112 (12), pp. 4435-4443, Publication Date (Web): (Mar. 1, 2008).*

(Continued)

*Primary Examiner* — Daniel S Metzmaier
(74) *Attorney, Agent, or Firm* — Dickinson Wright PLLC

(57) ABSTRACT

The present disclosure is directed to methods of preparing stable suspensions of precious metal nanoparticles and methods for attaching bio-molecules to the nanoparticles. The formation of nanoparticles can be accomplished by either chemical synthesis or pulsed laser ablation in a liquid. The present disclosure reveals the importance of controlling the conductivity of the dispersion medium during pulsed laser ablation in a liquid to control the particle size of the nanoparticles. The present disclosure also reveals the importance of adjusting and maintaining the conductivity in a range of 25 μS/cm or less during storage of the nanoparticles and just prior to performing bioconjugation reactions. The control of conductivity is an important process for maintaining the nanoparticles as a stable non-aggregated colloidal suspension in a dispersion medium.

25 Claims, 17 Drawing Sheets

(58) Field of Classification Search
USPC .......................................... 516/97; 556/110
See application file for complete search history.

(56) References Cited

U.S. PATENT DOCUMENTS

| | | | | |
|---|---|---|---|---|
| 2009/0263496 | A1* | 10/2009 | Kijlstra et al. | 424/600 |
| 2010/0009010 | A1* | 1/2010 | Gomori | 424/616 |
| 2010/0290043 | A1* | 11/2010 | White et al. | 356/301 |
| 2011/0192714 | A1 | 8/2011 | Liu et al. | |
| 2012/0114518 | A1* | 5/2012 | Hara | B29C 70/606 |
| | | | | 419/66 |
| 2012/0225021 | A1 | 9/2012 | Qian et al. | |
| 2014/0170070 | A1* | 6/2014 | Qian | G01N 21/658 |
| | | | | 424/9.1 |
| 2014/0288194 | A1* | 9/2014 | Niedermeyer | B82Y 40/00 |
| | | | | 516/33 |
| 2014/0322138 | A1* | 10/2014 | Ichikawa et al. | 424/9.4 |
| 2015/0110882 | A1* | 4/2015 | Ichikawa et al. | 424/491 |

FOREIGN PATENT DOCUMENTS

| | | | |
|---|---|---|---|
| JP | 2004182812 A | 7/2004 | |
| JP | 2005310703 A | 11/2005 | |
| JP | 2012136725 A | 7/2012 | |
| WO | WO-2010140714 A1 * | 12/2010 | ........... B29C 70/606 |

OTHER PUBLICATIONS

Simakin et al, Nanodisks of Au and Ag produced by laser ablation in liquid environment, Chemical Physics Letters, 348 (2001), pp. 182-186 (Nov. 9, 2001).*
Water, Analysis, Kirk-Othmer Encyclopedia of Chemical Technology (2000), John Wiley & Sons, Ltd, online @ http://dx.doi.org/10.1002/0471238961.01140112.a01 , pp. 1-13.*
John S. Bradley and Gunter Schmid, 3.2.1 Noble Metal Nanoparticles, Nanoparticles: from theory to application, Ed. Günter Schmid (2004 © ), pp. 185-199 & 230-236.*
Online English language machine translation of JP 2004-143571 A (dated May 20, 2004), https://www4.j-platpat.inpit.go.jp/eng/tokujitsu/tkbs_en/TKBS_EN_GM101_Top.action (Downloaded Sep. 28, 2018) (Year: 2018).*
Online English language machine translation of JP 2012-136725 A (dated Jul. 19, 2012), https://www4.j-platpat.inpit.go.jp/eng/tokujitsu/tkbs_en/TKBS_EN_GM101_Top.action (Downloaded Sep. 28, 2018) (Year: 2018).*
Rhebock, et al., Size Control of Laser-Fabricated Surfactant-Free Gold Nanoparticles With Highly Diluted Electolytes and Their Subsequent Bioconjugation, Phys. Chem. Chem Phys., 2013, 15, 3057-3067.
Amendola et al., Laser ablation synthesis in solution and size manipulation of noble metal nanoparticles, Physical Chem. Chem. Physics vol. 11, (2009) 3805-3821, first pub Apr. 1, 2009, DOI: 10.1039/b900654k.
Bell et al., SERS enhancement by aggregated Au colloids: effect of particle size, Physical Chemistry Chemical Physics vol. 11, 7455-7462, 2009.
Bonet et al., Synthesis of Monodisperse Au, Pt, Pd, Ru and Ir nanoparticles in ethylene glycol, NanoStructured Materials vol. 11, 8 pp. 1277-1284, 1999.
Brust et al., Synthesis of thiol-derivatised gold nanoparticles in a two-phase Liquid—Liquid system, J. Chem. Soc. Chem. Commun 1994 p. 801.
Darbouret et al., Ultrapure Water for Elemental Analysis down to ppt levels, ACTA Physica Polonica A vol. 116 Suppl. P S203 (2009).
DungDang et al., Synthesis and optical properties of copper nanoparticles prepared by a chemical reduction method, Adv. Nat. Sci.: Nanotechnology 2 (2011) 015009 (6pp).
Gros et al., Ionic composition of seawaters and derived saline solutions determined by ion chromatography, J. Chromatography A, 1210 (2008) 92-98.
S. J. Hurst et al., Maximizing DNA Loading on a Range of Gold Nanoparticle Sizes, Anal. Chem. 2006, 78, 8313-8318.
Kendall et al., Review: The Preparation of Conductivity Water. (Received Jun. 30, 1916 J Chem Soc. p. 2460.
Kim et al., Synthesis of Monodisperse Palladium Nanoparticles, Nano Letters vol. 3, No. 9, 2003, pp. 1289-1291.
Long et al., The synthesis and characterization of platinum nanoparticles a method of controlling the size and morphology, Nanotechnology 21 (2010) 035605 doi:10.1088/0957-4484/21/3/035605.
Marin-Almazo et al., Synthesis and characterization of rhodium nanoparticles using HREM techniques, Microchemical Journal 81 (2005) 133-138.
Pashley et al., De-Gassed Water is a Better Cleaning Agent, J. Phys. Chem B 2005, 109, 1231-1238 2005.
Perrault et al., Synthesis and Surface Modification of Highly Monodispersed, Spherical Gold Nanoparticles of 50-200 nm, JACS Communications, 131, 17042-17043 2009, published on Web Nov. 5, 2009.
Rehbock et al., Size control of laser-fabricated AuNP with highly diluted electrolytes and their subsequent bioconjugation, PCCP—Physical Chemistry Chemical Physics online—Oct. 3, 2012 DOI: 10.1039/C2CP42641B.
Solomon et al., Synthesis and Study of Silver Nanoparticles, Journal of Chemical Education vol. 84 No. 2 Feb. 2007 www.JCE.DivCHED.org.
Stamplecoskie et al., Optimal Size of Silver Nanoparticles for Surface-Enhanced Raman Spectroscopy, J Physical Chemistry C 2011, 115, 1403-1409.
J-P Sylvestre et al., Surface Chemistry of Gold nanoparticles Produced by laser Ablation in Aqueous Media, J. Phys. Chem. B 2004, 108, 16864-16869.
Turkevich et al., A study of the nucleation and growth processes in the synthesis of colloidal gold, Discussions of the Faraday Soc., 1951,11, 55-75 DOI: 10.1039/DF9511100055.
International Preliminary Report on Patentability, 15 Pages dated Jul. 28, 2015.

* cited by examiner

METHODS FOR PREPARING AQUEOUS SUSPENSION OF PRECIOUS METAL NANOPARTICLES

RELATED APPLICATIONS

This application claims the benefit of U.S. Provisional Application No. 61/756,622 filed on Jan. 25, 2013.

BACKGROUND

Field of the Invention

The present invention relates to methods for producing an aqueous suspension of precious metal nanoparticles, in particular, to methods for producing an aqueous suspension of gold nanoparticles for bioconjugation to functional ligands including bio-molecules.

Description of the Related Art

Precious metal nanoparticles (PMNPs) and colloidal PMNPs, also called precious metal nanocolloids (PMNCs), are being widely investigated for their potential use in a wide variety of biological and medical applications. Applications of the PMNCs include using the PMNC as an imaging agent, a sensing agent, a gene-regulating agent, a targeted drug delivery carrier, or as a photoresponsive antibacterial therapeutic agent. Most of these applications require a surface modification on the PMNPs, which is also referred to as a surface functionalization.

In the past most PMNCs have been made by chemical synthesis processes such as those based on a reduction of the precious metal in an ionic state or those based on forming complex ions with ligand molecules. Inherently, chemical syntheses produce chemical by-products such as those which are formed as a result of the counterpart reaction during the reduction of the precious metals resulting in residual ions in an electrolyte of the colloidal solution. Furthermore, currently commercially-available PMNCs made by chemical syntheses contain stabilizing agents that prevent the PMNPs from aggregating and precipitating out of the colloidal solution. The presence of the stabilizing agents or residual ions of the chemical by-products could cause instability of a colloidal system during a subsequent bioconjugation process. However, it is desirable for the surface functionalization of PMNP for bio-applications to yield stable resultant PMNCs without precipitation of the nanoparticles.

FIG. 1A is a flowchart showing a chemical synthesis process in the prior art for generation of nanoparticles followed by bioconjugation. As shown, process 100 starts with a colloidal solution of PMNPs (i.e., PMNCs) generated by a chemical synthesis method at step 102. After fabrication of the PMNCs, the colloidal solution is stored in a container, such as a capped glass container, for a period of time (step 104) until the subsequent bioconjugation process (step 106). The preparation step 102 may be done by purchasing commercially-available PMNCs, which are usually delivered and stored in a container.

Ligand exchange reactions have been found to be a powerful approach for surface modification of various inorganic colloidal nanoparticles including the PMNCs and are used to produce organic and water-soluble nanoparticles with various core materials and functional groups. One of the most difficult aspects of applying the ligand exchange reactions to the PMNCs is to achieve substantially complete ligand exchange as well as to preserve the stability of the colloidal suspension during the reaction.

Pulsed laser ablation in liquid (PLAL) is a method suitable for synthesizing functional nanoparticles directly from bulk materials, and can provide totally ligand-free nanoparticles. Commonly owned U.S. Patent Application Pub. No. 2012/0225021 discloses a method of producing stable bare colloidal gold nanoparticles in water by a top-down fabrication method using a PLAL method, with bulk gold as a target material. The results demonstrated colloidal stability of gold nanoparticles during surface functionalization with thiolated polyethylene glycol (PEG) characterized by monitoring the change of the absorbance of the localized surface plasmon resonance of gold nanocolloids at 520 nanometers (nm).

FIG. 1B is a flowchart showing a PLAL method in the prior art for generation of nanoparticles for bioconjugation. As shown, at step 112, a precious metal (PM) target material and a suspension liquid are provided for process 101. At step 114, PMNPs are generated by focusing laser pulses on the PM target material. The generated PMNPs are combined with the suspension liquid to form a colloidal suspension that has the PMNPs. At step 116, the colloidal suspension is stored in a container for a period of time (i.e., a storage period), and then used in a bioconjugation process to combine a bio-molecule ligand with the PMNP (step 118).

Notwithstanding such recent advancements in PLAL methods, when the overall process is considered from the generation of the PMNPs to the bioconjugation reaction at least two challenges remain. One is accurate size control of the PMNPs in the nanoparticle generation process. Another is ion concentration control of electrolytes during a subsequent procedure for conditioning the produced PMNCs specifically for bioconjugation reactions.

C. Rehbock et al. (*Phys. Chem. Chem. Phys.*, "Size control of laser-fabricated surfactant-free gold nanoparticles with highly diluted electrolytes and their subsequent bioconjugation", published on 3 Oct. 2012, DOI: 10.1039/C2CP42641B) demonstrated a nanoparticle size control process. The embodiment described generation of gold nanoparticles (AuNPs) for bioconjugation by using a nanosecond PLAL approach and a size control process with a highly diluted electrolyte. More specifically, the AuNPs are generated and dispersed into a carrier steam of water containing a trace amount of salts. To control the size of the AuNPs generated by the PLAL method with the highly diluted electrolyte, C. Rehbock et al. demonstrated a possibility of size control of the AuNPs by introducing a known amount of specific ions into the water. To produce the AuNPs in a diameter of 10 nm or larger, C. Rehbock et al. shows that a precise control of ion concentration is required, because the produced size of AuNPs changes strongly depending on the ion concentration when the ion concentration is in a range below 30 micromole (μM). At such low concentration ranges the effect of a trace amount of externally introduced ions, such as a contamination, on nanoparticle size are no longer negligible.

There are various ways to analyze individual ions in the electrolyte based on an element analysis such as inductively coupled plasma mass spectroscopy (ICP-MS), or based on molecular analyses such as high performance liquid chromatography (HPLC), liquid chromatography-mass spectrometry (LC-MS), Fourier transform infrared spectroscopy (FTIR) and Raman scattering (RS). However, all of these measurements are too costly and time consuming to perform every time before bioconjugation in order to evaluate the capability of the PMNCs for bioconjugation.

Thus, it is desirable to predict the capability of the PMNCs for bioconjugation and to control ion concentrations of the electrolytes of the solutions that the PMNCs are in.

SUMMARY OF THE INVENTION

In at least one embodiment the present invention includes a colloidal suspension comprising; precious metal nanoparticles having a concentration of more than 0.01 nM in a liquid including electrolyte, wherein the colloidal suspension has an electrical conductivity of 25 µS/cm or less.

In at least one embodiment the present invention includes a method of making a colloidal solution comprising the steps of: providing a liquid having an electrical conductivity; adjusting the electrical conductivity of the liquid to be less than 25 µS/cm; providing nanoparticles in a container; and combining the nanoparticles with the adjusted liquid in the container to form the colloidal solution that has a nanoparticle concentration of at least 0.01 nM.

In at least one embodiment the present invention includes a method of making a colloidal suspension comprising the steps of: providing precious metal nanoparticles; combining the precious metal nanoparticles with a liquid to form a colloidal suspension; purifying the colloidal suspension to decrease a total ion concentration in the colloidal solution to be 25 µS/cm or less; monitoring an electrical conductivity of the colloidal suspension; and adjusting, if required, the electrical conductivity of the colloidal suspension to be less than 25 µS/cm.

In at least one embodiment the present invention includes an apparatus comprising: a source of a liquid having an electrical conductivity; an electrical conductivity adjusting system receiving the liquid from the source and configured to adjust the electrical conductivity of the liquid; a container configured to receive the adjusted electrical conductivity liquid from the electrical conductivity adjusting system at an inlet and configured to produce a colloidal suspension at an outlet; an electrical conductivity monitoring device placed in the container proximate the inlet; wherein the electrical conductivity adjusting system, in response to the electrical conductivity monitoring device, is configured to maintain the electrical conductivity of the liquid at 25 µS/cm or less.

In at least one embodiment the present invention includes a method of making a colloidal suspension for bio-conjugation, the method comprising the steps of: providing a target material comprising a precious metal and a liquid containing deionized water and electrolyte as a dispersion medium in an ablation container; monitoring an electric conductivity of the dispersion medium with one or more conductivity monitoring devices and, if required, adjusting the electric conductivity of the dispersion medium by a conductivity adjustment system to be 25 µS/cm or less; generating precious metal nanoparticles by delivering laser pulses to the target material there by ablating the target material and forming a colloidal suspension of the precious metal nanoparticles and adjusting the colloidal suspension to contain at least 0.01 nM of the precious metal nanoparticles.

In at least one embodiment the present invention includes a method of bio-conjugation, comprising: receiving a colloidal suspension of precious metal nanoparticles in a dispersion medium; monitoring an electric conductivity of said colloidal suspension with one or more conductivity monitoring devices and, if required, adjusting the electric conductivity of the dispersion medium to be 25 µS/cm or less; and performing a bio-conjugation of said nanoparticles with bio-molecules by mixing said colloidal suspension with said bio-molecules so that at least a portion of said bio-molecules attach to said precious metal nanoparticles.

BRIEF DESCRIPTION OF THE DRAWINGS

Other aspects, features, and advantages of described embodiments will become more fully apparent from the following detailed description, the appended claims, and the accompanying drawings in which like reference numerals identify similar or identical elements.

DETAILED DESCRIPTION

Figure 1A:
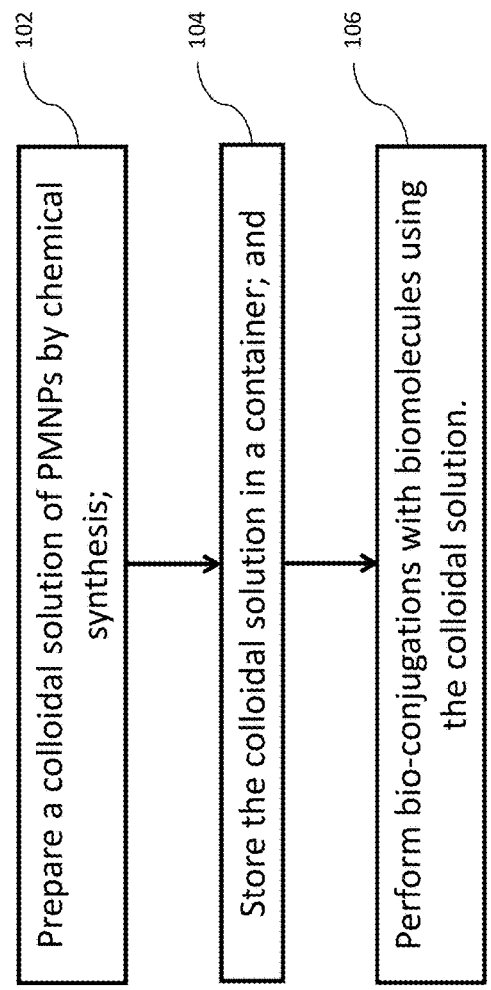
FIG. 1A is a PRIOR ART flowchart showing a chemical synthesis process in the prior art for generation of nanoparticles for bioconjugation reactions.
Figure 1B:
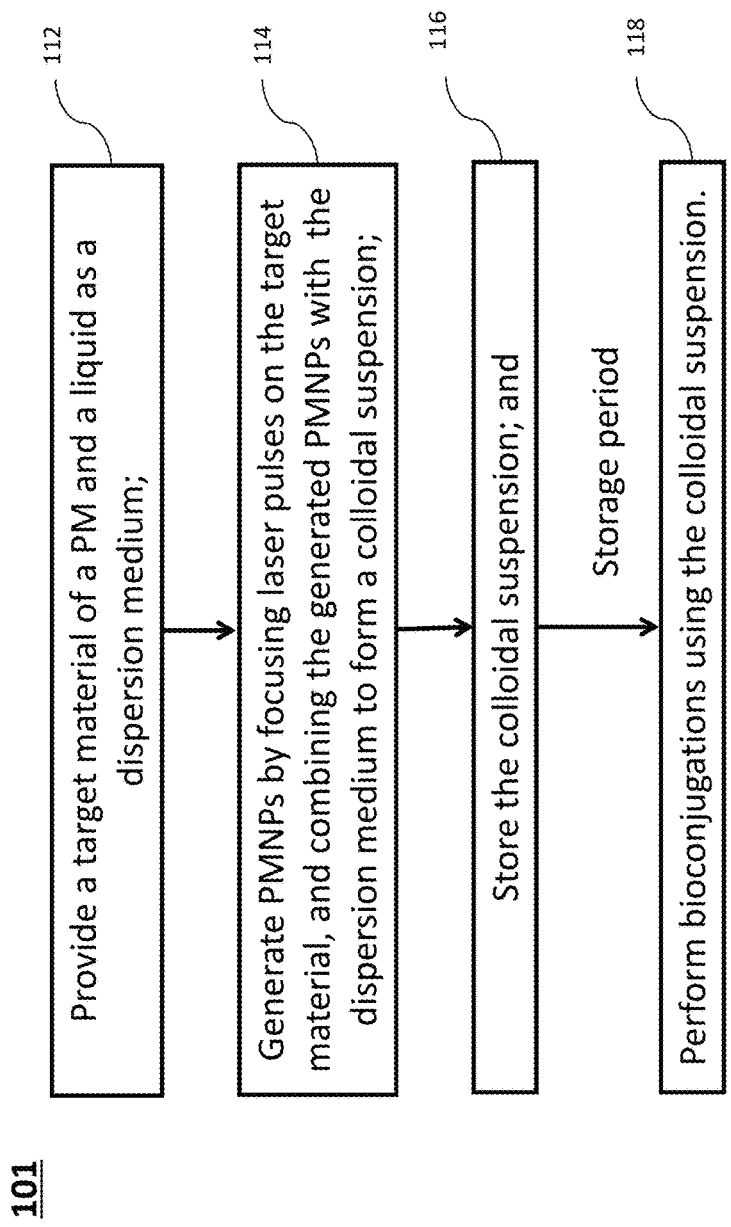
FIG. 1B is a PRIOR ART flowchart showing a PLAL method in the prior art for generation of nanoparticles for bioconjugation reactions.

Hereinafter, exemplary embodiments are described with reference to the drawings.

As used herein, the terms "colloidal suspension", "suspension", "colloidal solution", "colloid", and "PMNC" are used interchangeably, referring to a colloidal system wherein nanoparticles are dispersed in a dispersion medium. For example, a suspension may contain metal nanoparticles, deionized water, and electrolyte.

As used herein, a medium in which nanoparticles are to be suspended in is referred to as "dispersion medium" or simply "medium". For example, the medium may contain deionized water and one or more electrolytes.

As used herein, "suspension liquid", "colloidal suspension liquid" and "liquid" is used interchangeably to refer to the medium described above which may or may not contain the nanoparticles. The three terms are used interchangeably only if it is not necessary to specify whether or not the particles exist in the medium.

Precious metals (PMs) include gold, silver, copper, platinum, palladium, rhodium, ruthenium, iridium, osmium, and an alloy including at least one of the above listed metals. Precious metal nanoparticles (PMNPs) refer to precious metal fine particle or aggregates of precious metal fine particles. The nanoparticles may be approximately spherical in shape, with a diameter in the range from 1 nanometer to 1000 nanometer. Other nanoparticles may be somewhat irregular in shape and may be characterized by an average diameter in the range from 1 nanometer to 1000 nanometer, or characterized by an average size from 1 nanometer to 1000 nanometer in the longest dimension. Corresponding nanoparticles of the above listed precious metals, gold (Au), silver (Ag), copper (Cu), platinum (Pt), palladium (Pd), rhodium (Rh), ruthenium (Ru), iridium (Ir), and osmium (Os) are abbreviated, using the atomic symbols of these elements, to AuNP, AgNP, CuNP, PtNP, PdNP, RhNP, RuNP, IrNP, and OsNP, respectively. Precious metal nanocolloids (PMNCs) refer to colloidal suspensions of the PMNPs. Correspondingly, nanocolloids of the above listed precious metals, gold (Au), silver (Ag), copper (Cu), platinum (Pt), palladium (Pd), rhodium (Rh), ruthenium (Ru), iridium (Ir), and osmium (Os) are abbreviated to AuNCs, AgNCs, CuNCs, PtNCs, PdNCs, RhNCs, RuNCs, IrNCs, and OsNCs, respectively.

As used herein, the term "surface functionalization" refers to conjugation of functional ligand molecules to the surface of nanoparticles. The term "bioconjugation" refers to "surface functionalization" with bio-molecule ligands to the surface of the nanoparticles. The term "bio-molecule ligand" refers to a biologically-relevant ligand molecule including but not limited to: biologically active molecules, biologically significant molecules, and biologically compatible molecules having at least one biologically-relevant functional group. "Bio-molecule ligand" may be also abbreviated as "bio-molecule" in the present specification and claims.

Herein the terms "laser beam" and "pulsed laser beam" are used interchangeably and refer to an intermittent laser processing beam providing at least one pulse for irradiation of a target material, and may be further characterized by parameters such as: (temporal) pulse width, pulse duration, pulse energy, peak power, fluence, beam size, beam profile, spot distribution, or spot size. A pulsed laser beam may comprise a burst of pulses of short duration.

Herein the term "stable" is defined for the stability of the colloidal system of the present invention based on the change of UV-Vis absorption spectrum during bioconjugation with respect to a control sample without bio-molecules to be conjugated. For Au nanocolloids the stability criterion requires that both of the following two conditions are satisfied:

i). The change of optical absorbance at wavelength of surface plasmon resonance (SPR), which is typically around 520 nm for about 15-20 nm size AuNPs, is within plus/minus 15% based on the control absorbance;

ii). The ratio of (absorbance at 650 nm)/(absorbance at SPR)<0.2.

The following detailed description also utilizes a number of acronyms, which are generally well known in the art. While definitions are typically provided with the first instance of each acronym, for convenience, Table 1 provides a list of the acronyms and abbreviations used in the present application and claims along with their respective definitions.

TABLE 1

| | |
|---|---|
| PLAL | Pulsed Laser Ablation in Liquid |
| PM | Precious Metal |
| PMNP | Precious Metal Nanoparticle |
| PMNC | Precious Metal Nanocolloid |
| PCSNC | Purification of Chemically Synthesized Nanocolloid |
| SPR | Surface Plasmon Resonance |

For convenience, Table 2 lists various units of concentration, resistance, or the like:

TABLE 2

| Unit | Abbreviation | Parameter |
|---|---|---|
| Molar | M | Molar concentration |
| Micromolar | μM | Micro Molar concentration |
| Siemens | S | Electrical Conductance |
| Microsiemens per centimeter | μS/cm | Electrical Conductivity |
| Ohm | Ω | Electrical Resistance |
| MegaOhms centimeter | MΩcm | Electrical Resistivity |

Described embodiments of the present invention relate to methods of producing colloidal suspensions of precious metal nanoparticles (PMNPs) for bioconjugations and the PMNP suspension prepared by the methods thereof. The described embodiments disclose two methods of producing colloidal PMNPs for stable bioconjugations. The first one is a pulsed laser ablation in liquid method (PLAL), and the second one is a purification of chemically synthesized nanocolloids method (PCSNC). The described embodiments feature, among other things, use of electrical conductivity or its reciprocal electrical resistivity as an observable physical parameter to monitor, control, or specify for the purpose of controlling the total ion concentration in a PMNP colloidal suspension. Furthermore, the described embodiments control PMNP sizes of the PMNCs for the subsequent bioconjugation, particularly when prepared with the PLAL method. The disclosed fabrication of the PMNCs by the PLAL method includes monitoring conductivity of a dispersion medium before or during executing the PLAL method for generating the PMNPs and also includes adjusting conductivity of the dispersion medium if an adjustment of conductivity is required for a predetermined size of the PMNPs. Similarly, conductivity may be subsequently monitored and controlled so as to be maintained within a process control limit, such that the conductivity is within a desired range at or near a time at which bioconjugation is carried out.

The PLAL method of generating the colloidal suspension of the PMNPs includes a step of adjusting electrical conductivity of the colloidal suspension and adjusting particle sizes of the generated PMNPs, particularly in the size range of about 10 nm or larger, through control of a total ion concentration of a dispersion medium in which the PMNPs are to be dispersed. The PLAL method also includes a step of size refinement to reduce the variance in the size of PMNPs. The combination of the two steps results in a PMNP size distribution similar to a conventional lognormal statistical distribution and a well-controlled narrow peak and smooth tails, in which secondary peaks, shoulders, wings and others anomalies are eliminated.

The chemical method of generating the colloidal suspension of the PMNPs also includes a step of adjusting electrical conductivity of the colloidal suspension and thereby adjusting particle sizes of the generated PMNPs, particularly in the size range of about 10 nm or larger, through control of a total ion concentration of a dispersion medium in which the PMNPs are dispersed.

Factors causing the ion concentration to change in water include storage conditions, such as container material and storage temperature of the electrolyte or deionized water used to prepare the electrolyte, which influence the total ion concentration. Other factors include the presence of dissolved gases.

Effects of externally introduced ions in the dispersion medium of the PMNPs are investigated. The ion concentration may be determined by measurement of the electrical conductivity of the colloidal suspension. Time evolution of the electrical conductivity of the colloidal suspension in deionized water stored at room temperature in different commercially-available containers shows significant variations for stored PMNCs, particularly for lengthy storage periods.

In the described embodiments, monitoring and adjusting the electrical conductivity may be carried out at the time of PMNP generation, during a storage period, at a time at or near bioconjugation, or any suitable combination. Such monitoring or adjustment is performed with the PLAL or chemical methods. The monitoring and adjusting of the electrical conductivity are not only important for bioconjugation, but they also stabilize the quality of the produced PMNPs by the PLAL method when carried out in the dispersion medium in which the PMNPs are to be dispersed, or prior to irradiation with the laser in PLAL arrangements.

PMNC Generation by PLAL

Figure 2:
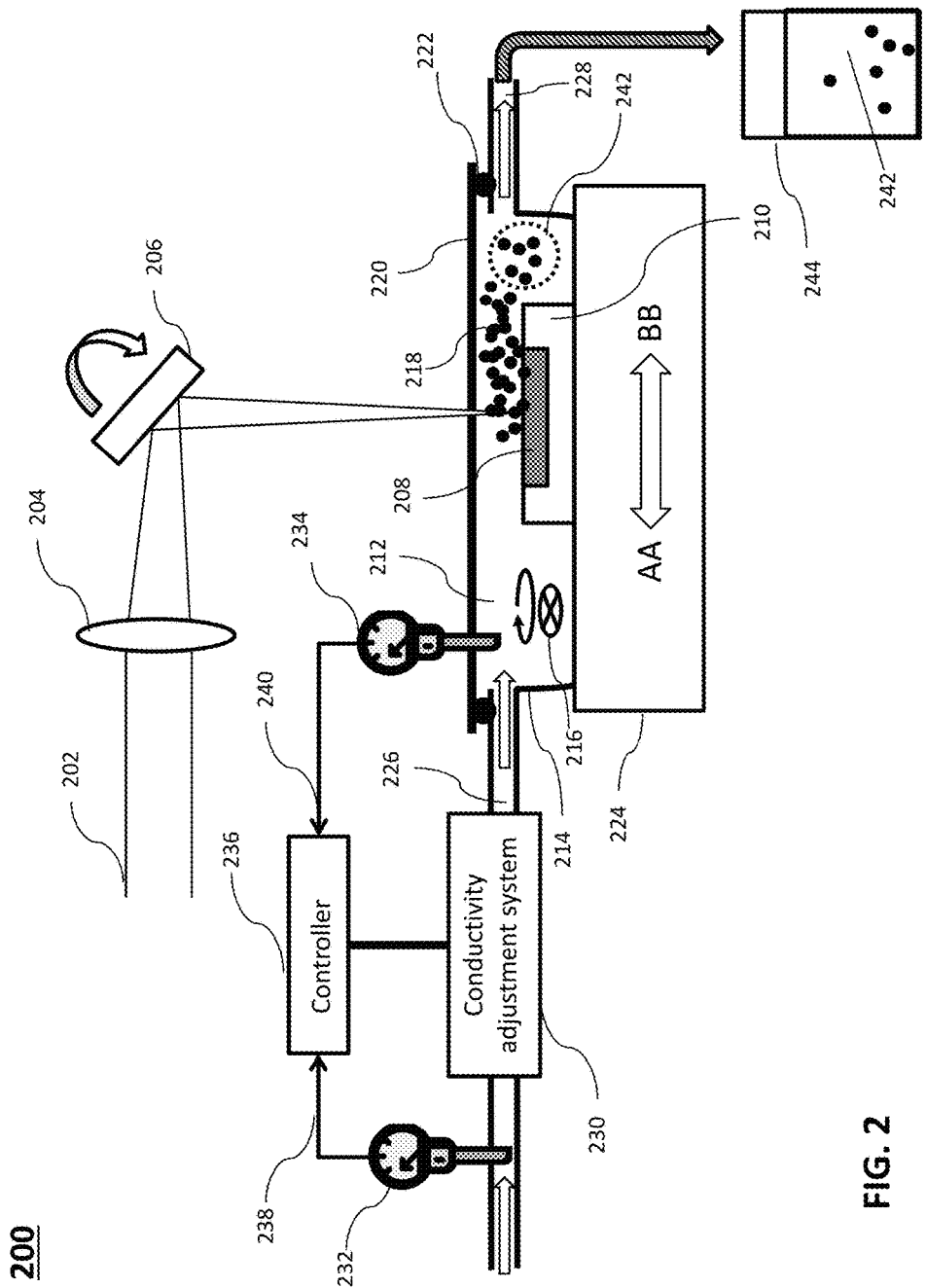
FIG. 2 is a schematic view of a laser based system for producing PMNCs for bioconjugation with a bulk precious metal target using a PLAL method in accordance with exemplary embodiments of the present invention.

FIG. 2 is a schematic view of a laser based system for producing PMNCs for bioconjugation using a bulk target of a precious metal using a PLAL method in accordance with exemplary embodiments of the present invention. As shown, the PLAL system 200 includes laser beam 202, lens 204, guide mechanism 206, bulk target 208, target holder 210, suspension liquid 212, container 214, stirring bar 216, generated PMNPs 218, optical window 220, O-ring seal 222, motion stage 224, inlet 226, outlet 228, conductivity adjustment system 230, conductivity monitoring device 232, conductivity monitoring device 234, controller 236, feedback data 238 and 240 from respective conductivity monitoring device 232 and 234, colloidal suspension 242 as a region of suspension liquid 212 prior to collection and storage in PMNC container 244.

The laser beam 202 may be delivered by a pulsed laser source (not shown), focused by the lens 204 and guided by the guide mechanism 206 to irradiate the target 208.

An output wavelength of the pulsed laser source may be from the mid-infrared to near-infrared range (e.g., about 2000 nm to 780 nm), to the visible range (e.g., 700 nm to 400 nm) or to the ultraviolet range (e.g., 395 nm to 266 nm).

The laser beam 202 preferably provides a pulse repetition rate from 1 kHz to 100 MHz, 10 kHz to 1 MHz, 100 kHz to 10 MHz, or from 100 kHz to 1 MHz. In at least one embodiment high repetition rate pulses in the range from above 100 KHz to about 10 MHz may be utilized to generate PMNPs.

The laser beam 202 may provide a pulse energy of from 10 nanoJoules (nJ) to 2 milliJoules (mJ), more preferably from 50 nJ to 300 microJoules ($\mu$J), or from 0.1 to 100 $\mu$J.

The laser beam 202 may provide a pulse having a duration from 10 femtoseconds (fs) to 100 nanoseconds (ns), from 10 fs to 10 ns, or from 30 fs to 10 picoseconds (ps).

Extremely short pulse durations, for example shorter than 100 fs, reduce unwanted thermal effects, but when the pulse duration approaches several tens of femtoseconds, or when the liquid layer has a non-negligible thickness, a temporal broadening of the pulse duration due to the wavelength dispersion of the refractive index in the liquid (e.g., suspension liquid 212) becomes significant. Such dispersion may be compensated using one or a combination of techniques. An additional optical component for dispersion compensation may be inserted in the optical path to compensate for the dispersion of the pulse. The optical components for the dispersion compensation include, but are not limited to, a pair of optical diffractive gratings and a pair of volume Bragg gratings. Insertion of a material having a dispersion of the opposite sign can compensate dispersion of the pulse. An optical waveguide including, but not limited to, an optical fiber, a photonic crystal fiber, a photonic band gap fiber, a non-linear optical fiber, and a fiber Bragg grating can also compensate the effect of pulse duration broadening.

In one exemplary embodiment, the pulsed laser source for generating the laser beam 202 may be a commercially available ultrafast fiber laser operating at 1045 nm with an adjustable pulse repetition rate of 100 kHz to about 5 MHz. For example, a D-1000 ultrafast fiber laser available from IMRA America Inc. may be utilized in the PLAL system 200 as a laser pulse source. The D-1000 IMRA ultrafast fiber laser may produce laser pulses with pulse energy up to 10 $\mu$J per pulse and pulse width shorter than 700 femtoseconds (fs) at a repetition rate of 100 kHz.

The lens 204 is a focal lens that may be an f-theta lens. The guide mechanism 206 may be a two dimensional laser scanning system. For example the guide mechanism 206 may be a X-Y galvanometer scanner equipped with the f-theta lens (i.e., the lens 204).

In one exemplary embodiment, the laser scanning arrangement of the guide mechanism 206 is configured as a post-objective scanning system. Other suitable scanning arrangements and beam/target positioning mechanisms may be utilized with design choices for the guide mechanism 206 based on scan speed, positioning accuracy, and other variables.

In another exemplary embodiment, the guide mechanism 206 may be a vibration mirror configured for fast scanning or other movement of the laser beam 202 on the surface of the target 208. The vibration frequency of the vibration mirror is preferably 10 Hz or greater with angular amplitude of 1 mrad or greater, such that a scanning speed on the surface is 0.01 m/s or greater. The vibration mirror may be a piezo-driven mirror, a galvanometer mirror, or other suitable apparatus for beam movement. Two or more mirrors may be used to achieve a two-dimensional movement in an image plane of an objective lens as discussed above. Preferably, an image plane and the target surface of the target 208 are entirely in parallel, and more preferably the incident angle of the laser beam 202 on target 208 is a constant angle independent of the position of a spot in the image plane. Another lens or lens system may be also implemented to adjust the position of a focusing point of the laser beam 202 along the optical path. The lens 204 may be placed before or after the guide mechanism 206.

The target 208, which may be received as a commercially available precious metal target, may be mounted in the target holder 210. The target 208 may be a bulk precious metal having a flat surface. The target 208 and target holder 210 are submerged by several millimeters, and preferably from several millimeters to preferably less than 1 cm below the surface of the suspension liquid 212 in the container 214.

In some implementations a molding step or a shaping step such as a cutting, pressing, machining and post-forming process may be applied to the bulk precious metal of the target 208 to make the surface of the target 208 flat. The flat surface may be polished.

In an alternative embodiment, the target 208 may not be completely submerged in the suspension liquid 212. As long as a portion of the target 208 is in contact with the suspension liquid 212, the laser ablation by the PLAL method may take place at an interface of the target 208 and the suspension liquid 212.

The target holder 210 may be made of an optically durable and chemically inert material such as glass, but it is not necessary as long as the target 208 is held steady in position.

The suspension liquid 212 may include water, methanol, ethanol, acetone, or another organic liquid containing electrolyte and acts as a dispersion medium for generating the PMNCs.

The suspension liquid 212 may be de-ionized or distilled water having electrolyte dissolved therein where the conductivity of the suspension liquid 212 is adjusted to a value of 25 µS/cm or smaller, from 1 µS/cm to 10 µS/cm, or from 1.5 µS/cm to 8 µS/cm, according to a required size for the generated PMNPs 218.

The dissolved electrolyte may be an organic salt such as citrate, an inorganic and complex ion salt including anions and cations formed with at least one element from the following:
  a) alkali metals (i.e., Group 1 elements in the periodic table) such as Na and K;
  b) alkaline-earth metal (i.e., Group 2 elements in the periodic table) such as Mg and Ca;
  c) pnictogen (i.e., Group 15 elements in the periodic table) such as N and P;
  d) chalcogen (i.e., Group 16 elements in the periodic table) such as O and S;
  e) halogen (i.e., Group 17 elements in the periodic table) such as Cl, Br and I; and The PLAL system 200 includes a liquid circulation system (not shown). The flow of the suspension liquid 212 is introduced into the container 214 by the liquid circulation system from the inlet 226 and flows to the outlet 228. Preferably, the suspension liquid 212 flows at a rate of 1 ml/s or greater, and more preferably at a rate of 10 ml/s or greater. Here, the flow of the suspension liquid 212, the movement of the laser beam 202 on the target 208, or both may be used to control heat accumulation in the area of laser irradiation.

The liquid layer thickness of the suspension liquid 212 is determined by negligible linear as well as nonlinear absorption of the laser beam 202. Thus, the wavelength of the laser beam 202 is from the mid-infrared to near-infrared range (e.g., about 2000 nm to 780 nm), to the visible range (e.g., 700 nm to 400 nm) or to the ultraviolet range (e.g., 395 nm to 266 nm).

A portion of the suspension liquid 212 in which the generated PMNPs 218 exist in a form of a colloidal suspension is illustrated as the region 242 shown in FIG. 2. The colloidal suspension 242 is collected and stored in the container 244. For a circulation system, the colloidal suspension 242 may be taken at any suitable location through which the suspension liquid 212 moves from the outlet 228 to the inlet 226

The container 214 is covered by the optical window 220. The O-ring seal 222 is placed between the optical window 220 and the container 214 to prevent the suspension liquid 212 from leaking out. The container 214 is fixed on the motion stage 224 that produces translational motion as indicated of the container 214 and the suspension liquid 212. The container 214 has the inlet 226 and the outlet 228 and the suspension liquid 212 flows through the container 214 from the inlet 226 to the outlet 228, so that the generated PMNPs 218 are carried away and collected and stored in the PMNC container 244. In various implementations the flow of the suspension liquid 212 should be fast enough to fill the gap between ablated material of the target 208 and the glass window 220 and avoid having any gas bubbles generated during laser ablation from staying on the optical window 220.

The stirring bar 216 generates a flow of the suspension liquid 212, which helps prevent the generated PMNPs 218 from remaining in a laser irradiating area. The flow of the suspension liquid 212 also cools a laser focal volume.

Figure 5A:
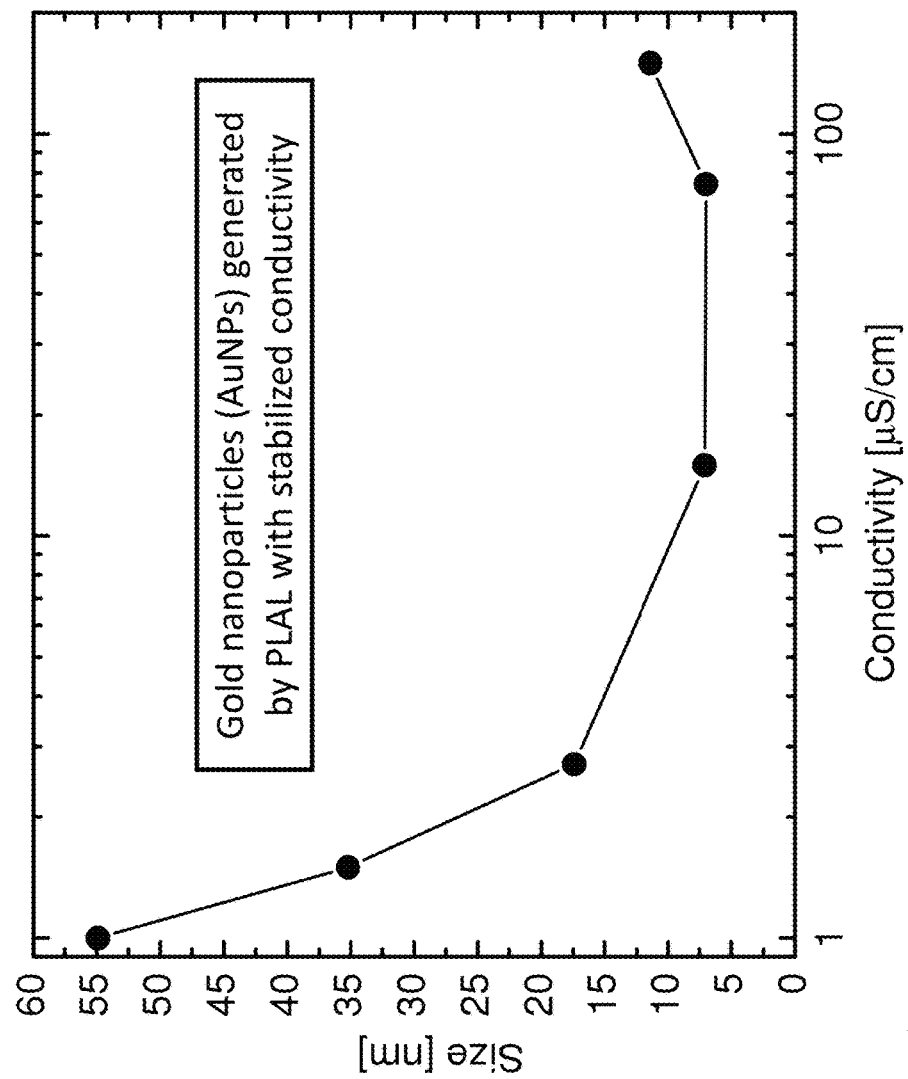
FIG. 5A is a plot of particle sizes of AuNPs generated by the PLAL method in different conductivity electrolytes in accordance with exemplary embodiments of the present invention.
Figure 5B:
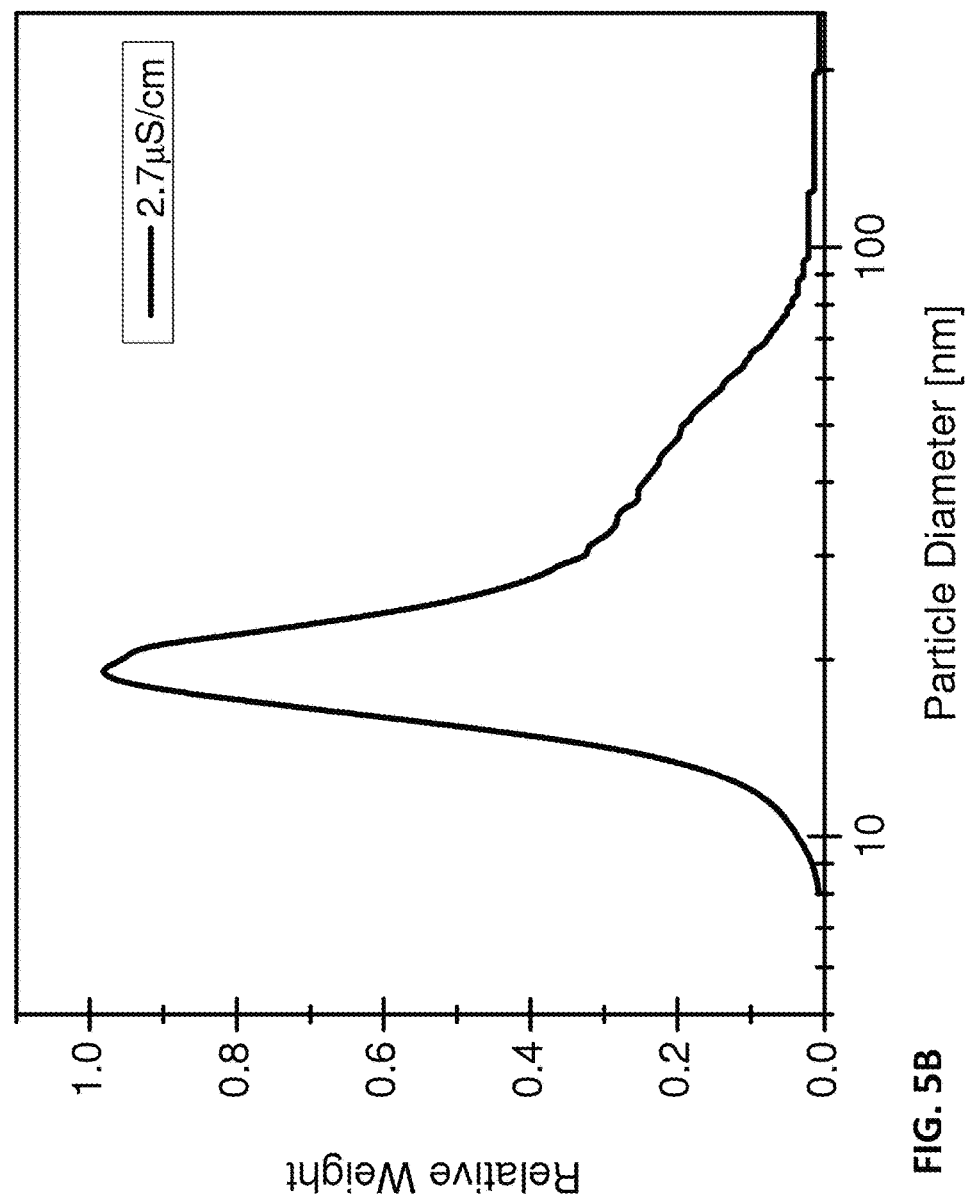
FIG. 5B is a plot of a particle size distribution of AuNPs generated by the PLAL method at a conductivity of 2.7 µS/cm in accordance with exemplary embodiments of the present invention.

The generated PMNPs 218 have a particle diameter in a range of about 1 to 1000 nm. The data shown in FIG. 5B shows the particle size distribution of AuNPs generated by the PLAL method in a suspension medium having a conductivity stabilized at 2.7 µS/cm. One can see that the majority of the nanoparticles had a size of from 10 to 100 nm.

The optical window 220 is placed on the top of the container 214, as such, the gap between the target 208 and the glass window 220 is filled with the flowing suspension liquid 212. Liquid flow may uniformly distribute the generated PMNPs 218 in the suspension liquid 212. If there is no optical window 220 on top of the container 214, the upper surface of the flowing the suspension liquid 212 may fluctuate during flowing and may cause a fluctuation in the thickness of the suspension liquid 212 above ablation the target 208. This may change the optical path of the laser beam 202 and cause a broader size distribution of the generated PMNPs 218. Therefore, in the described embodiments of the present invention, the optical window 220 above the flowing the suspension liquid 212 is introduced to keep a constant depth of the suspension liquid 212 above the ablation target 208. Furthermore, without the circulation system, a lateral vibration movement AA-BB, for example perpendicular to the laser beam 202 as indicated in FIG. 2, to the motion stage 224 that may also cause the suspension liquid 212 to flow locally across an ablation spot on the target 208.

The O-ring seal 222 is placed between the container 214 and the optical window 220 to seal the container.

The motion stage 224 preferably has a vibration frequency of several Hz, for example a vibration frequency in the range from about 0.001 to 100 Hz, and an amplitude of several millimeters. A shaker (not shown) may also be used to generate liquid circulation, where a circular movement of the shaker causes a circular movement of the suspension liquid 212 too. The optical window 220 might not be necessary for using the motion stage 224 or the shaker. However, the use of the motion stage 224 or the shaker may introduce non-uniformity in the thickness of the liquid layer above target 208 and cause a broader size distribution of the generated PMNPs 218 if the optical window 220 is not used.

The inlet 226 and the outlet 228 of the container 214 are located on the container having a certain distance, for example, in the opposite sides of the container, to have the inlet 226 locate in a region where no PMNP is generated and the outlet 228 locate in a region where PMNPs are generated.

The conductivity adjustment system 230 is placed in an upstream location of the container 214 near the inlet 226 and controlled by the controller 236. The conductivity monitoring device 232 is used to monitor an upstream conductivity of the suspension liquid 212 before the conductivity adjustment system 230. The conductivity monitoring device 234 is used to monitor a conductivity of the suspension liquid 212 in the container 214 before generating the PMNPs 218. The controller 236 receives feedback data 238 and 240 from the conductivity monitoring devices 232 and 234, respectively, and controls the conductivity adjustment system 230 so that a required conductivity may be stabilized in the suspension liquid 212 just before generating the PMNPs 218 by the PLAL. In certain embodiments the electrical conductivity of both the suspension liquid 212 and the extracted colloidal suspension in PMNC container 244 are to be measured. The conductivity of each of the suspension liquid and the colloidal suspension are to be within respective predetermined ranges. Preferably the conductivity of the colloidal suspension is 25 µS/cm or less whereas the conductivity of the suspension liquid preferably is in the range below 20 µS/cm. Adjusting the electrical conductivity includes adding a sufficient quantity of electrolyte solution to the liquid or colloidal suspension if the electrical conductivity is less than the desired range. If the electrical conductivity is greater than the desired range adjusting electrical conductivity includes adding a sufficient quantity of water or a highly-dilute electrolyte to the liquid or colloidal suspension. In the system shown in FIG. 2 the system 200 can include supplies of electrolyte solution and highly dilute electrolyte solution or water connected to the conductivity adjustment system 230, these are not shown for clarity of the figure. The conductivity adjustment system 230 under direction of the controller 236 adds the appropriate solution to the suspension liquid 212 to maintain the conductivity in the desired range. The feedback data 238 and 240 ensure the appropriate adjustments. Calibration steps may use correlation data such as shown in FIG. 5A between the conductivity in the dispersion media and the resultant particle size for the control of particle size. For the colloidal suspension, at least two kinds of conductivity data can be suggested to be useful. One is the time evolution of the conductivity increase in the container where the produced PMNC is to be stored. With the data given, one can estimate a period of the PMNC lifetime. Another useful type of conductivity data is data on an optimum range for bio-conjugation for a chosen biomolecule to be conjugated. By conditioning the conductivity according to the calibration data, the bio-conjugation process can minimize a risk of inducing a colloidal instability during the process. The step of adjusting the conductivity can be a manual, semi-automatic, or an automated process.

The conductivity monitoring devices 232, 234 may be a commercially-available electrical conductivity meters or resistivity meters, for example, a commercially-available water conductivity meter or water resistivity meter. In some embodiments a minimum detectable change in conductivity between about 1 µS/cm and 5 µS/cm, or better, is required for the commercially-available electrical conductivity meters to be used for the conductivity monitoring devices 232, 234.

As well known in the art, resistivity is the reciprocal of the conductivity, the range from 1 µS/cm to 5 µS/cm in conductivity is converted to the range from 1 MΩcm to 0.2 MΩcm in resistivity for the conductivity monitoring devices 232, 234. The conversion relation between resistivity and conductivity is Resistivity in MΩcm=1/(Conductivity in µS/cm). Hereinafter these equivalent parameters are unified into conductivity (µS/cm). In some exemplary embodiments the resolution for the conductivity measurement is about 1 µS/cm or better.

Figure 3:
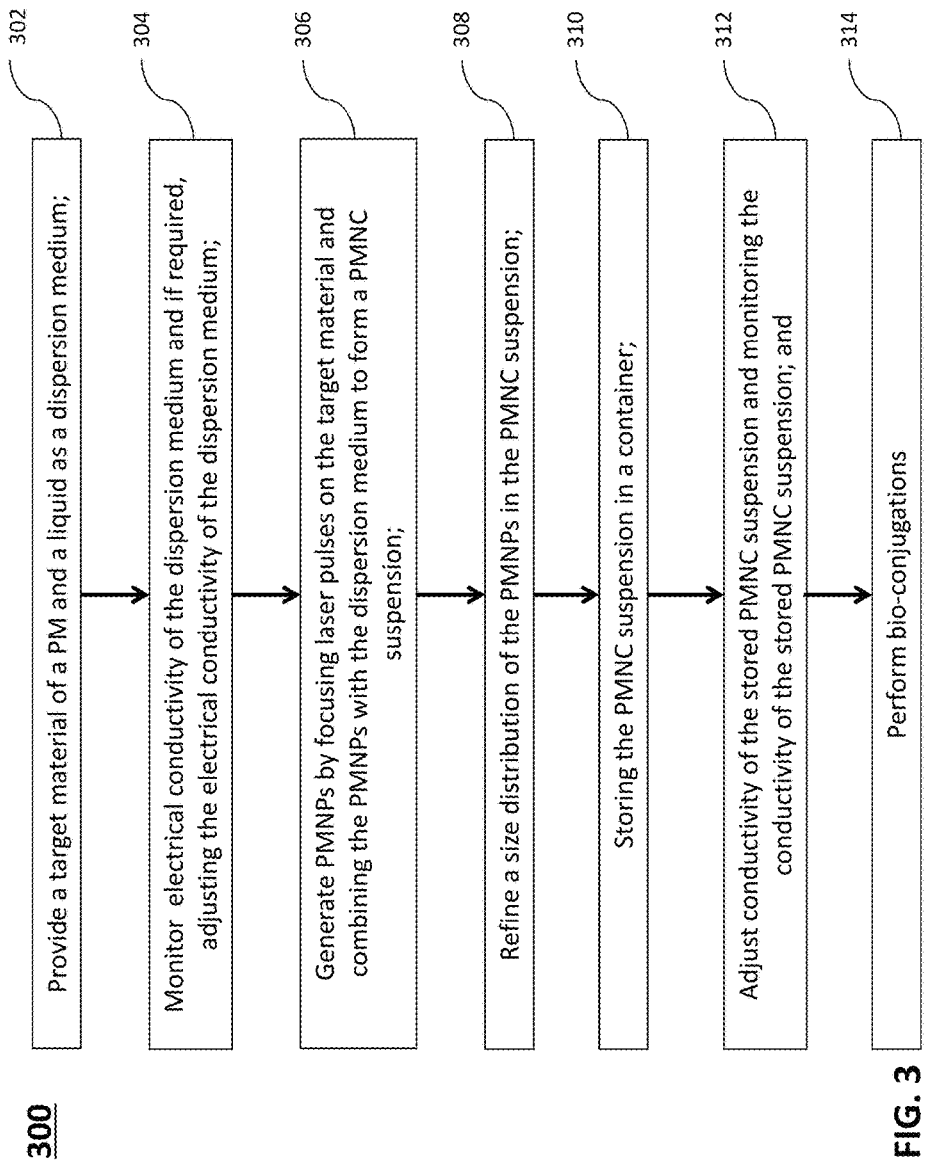
FIG. 3 is a flowchart showing a process from generation of nanoparticles to bioconjugation by the PLAL method shown in FIG. 2 in accordance with exemplary embodiments of the present invention.

FIG. 3 is a flowchart showing a process from generation of nanoparticles to bioconjugation by the PLAL method shown in FIG. 2 in accordance with exemplary embodiments of the present invention. As shown, PLAL process 300 includes using electrical conductivity or resistivity of the electrolyte in the suspension liquid as an observable physical parameter to accurately control the size of the generated PMNPs. The PMNCs generated by the PLAL method includes a process of monitoring and adjusting the electrical conductivity of the electrolyte before or during generating the PMNPs. Monitoring or adjusting conductivity, or both, may be carried out subsequent to PMNP generation, up to a time near or during which bioconjugation is performed. The PLAL method may provide a method that accurately controls the size of the PMNPs.

As shown, at step 302, the target 208 of a precious metal is received, or otherwise provided, for an ablation target. In one exemplary embodiment, the target 208 includes a bulk gold target positioned in the container 214 having removable the optical window 220 on the top of the container 214. At step 302, the suspension liquid 212, as a medium in which PMNPs are to be dispersed, is also provided. The target 208 is submerged a distance, from several millimeters to preferably less than 1 cm, below the surface of the suspension liquid 212. The suspension liquid 212 may be any liquid that is transparent to the wavelength of the laser beam 202. The suspension liquid 212 acts as a dispersion medium for nanoparticles to be distributed. The nanoparticles may be distributed more or less evenly throughout the dispersion medium. The suspension liquid 212 may include water, methanol, ethanol, acetone, or another organic liquid that contains electrolyte.

In one embodiment, the suspension liquid 212 is deionized water having an electrolyte whose conductivity is lower than 25 µS/cm, and preferably in the range from 1 µS/cm to 10 µS/cm. The PLAL system 200 thus allows for generating the PMNCs in situ in the suspension liquid 212. The formed PMNCs are then stably suspended in the suspension liquid 212 and thus no dispersants, stabilizer agents, surfactants or other materials are required to maintain the colloidal gold suspension in a stable state. Here, an ion concentration in the suspension liquid 212 may be preliminarily estimated according to the amount of the electrolyte in the suspension liquid 212 and a factor of dilution or concentration of the electrolyte.

At step 304, the electrical conductivity of the suspension liquid 212 before or during generating the PMNPs 218 is monitored by the conductivity monitoring devices 232, 234. The electrical conductivity of the suspension liquid 212 is also adjusted by the conductivity adjustment system 230 if an adjustment of the conductivity is required for a predetermined size of the PMNPs 218.

As described above, the total ion concentration in water can be easily changed in the low concentration ranges needed by external factors such as an exposure to the surface of a container material for production, the environment or storage and to atmosphere. Subsequent to contact with the container the water may contain additional ions to the initially estimated ion amount of the suspension liquid 212, which can have a great impact on the size of generated the PMNPs 218 in a highly-diluted electrolyte using the PLAL method. In practice, it is difficult for the water or electrolyte to avoid any external contact. However, the uncertainty of the total ion concentration in the highly-diluted electrolyte may be solved in the described embodiments of the present invention by measuring the electrical conductivity of the highly-diluted electrolyte before irradiating the laser beam 202 on the target 208. The conductivity monitoring devices 232, 234 are employed in the described embodiments to measure the electrical conductivity or resistivity of the highly-diluted electrolyte. For example, the conductivity monitoring device 232 is placed at the inlet 226 to measure the electrical conductivity or resistivity of the highly-diluted electrolyte before the highly-diluted electrolyte enters the container 214. The conductivity monitoring device 234 is placed in the container 214 close to the inlet 226, where no PMNPs are generated, to measure the electrical conductivity or resistivity of the highly-diluted electrolyte.

It is known in C. Rehbock et al., FIG. 4A, that the effect of externally introduced ions in water or electrolyte is no longer negligible when the ion concentration is in the range below 30 µM. Thus, particle diameters of the generated AuNPs change when the ion concentration is in the range below 30 µM.

In general, the conductivity of the electrolyte is converted to the total dissolved solid (TDS) in water assuming that the solid is sodium chloride (NaCl). Through this conversion, a conductivity of 1 µS/cm corresponds to about 0.6 mg of NaCl/kg of water, which is about 10 µM in molar concentration. Taking that conversion into account, the ion concentration of 30 µM, below which sizes of the generated AuNPs strongly depend on the ion concentration, corresponds to a conductivity of about 3 µS/cm. Particularly, an ion concentration of 10 µM or smaller is required to produce the AuNPs larger than about 15 nm according to C. Rehbock et al.

Figure 4:
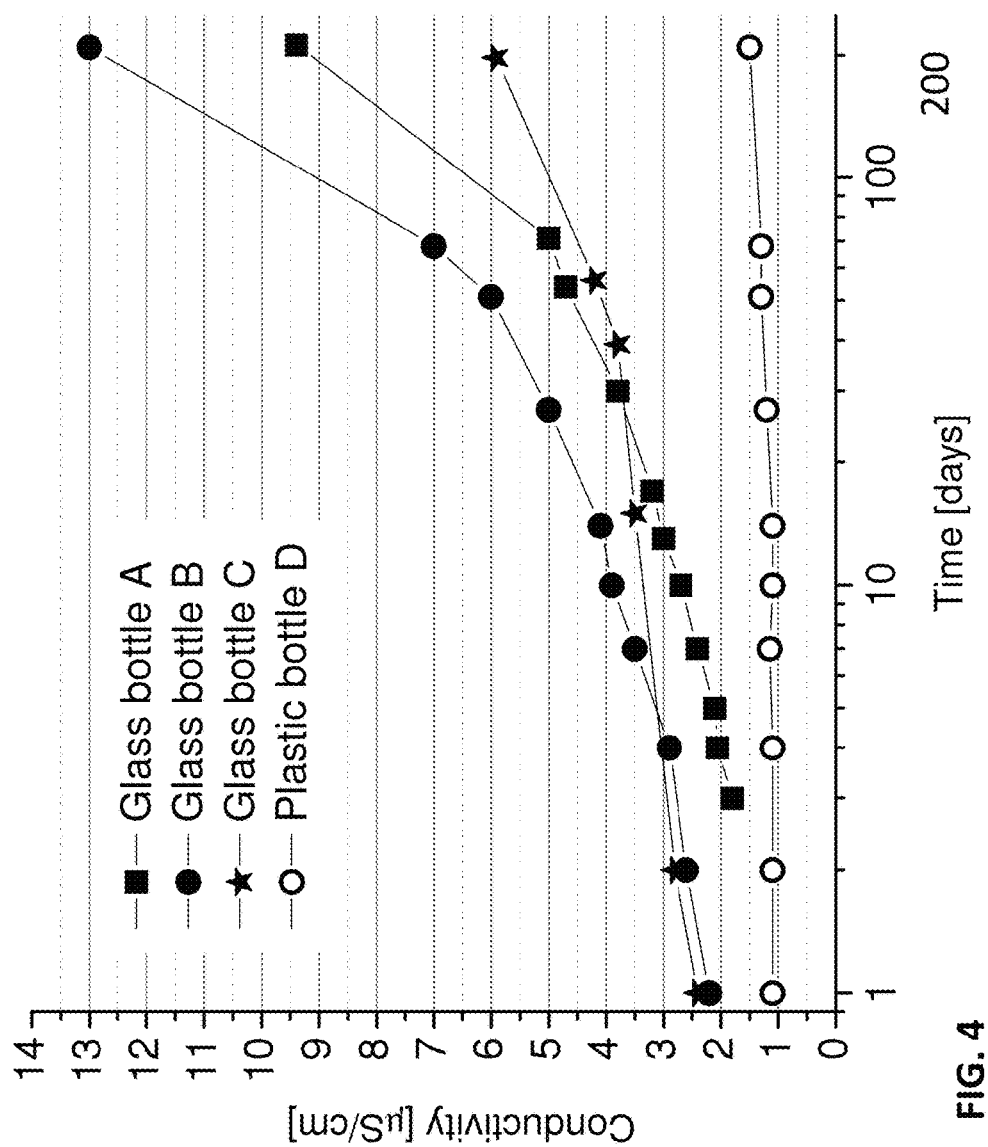
FIG. 4 is an example of the time evolution of electrical conductivity in deionized water containing electrolyte stored at room temperature in four different commercially-available containers in accordance with exemplary embodiments of the present invention.

As calculated above, the introduction of 10 µM of NaCl causes an increase in the electrical conductivity of about 1 µS/cm. In proportion, introduction of 1 µM of NaCl gives only 0.1 µS/cm increase of conductivity. It has been predicted, theoretically, that the electrical conductivity of extremely purified water at 25° C. can be as low as 0.055 µS/cm. However, in practice, it has been recognized that a typical electrical conductivity of deionized water stored and equilibrated in atmosphere at room temperature is in the range between 0.5 µS/cm and 1.5 µS/cm. As a result, for example, simply transferring the highly-diluted electrolyte from a storage container to the ablation container 214 and subsequent storage of the colloidal suspension can alter the initial ion amount in a dispersion medium. FIG. 4 is an example of time evolution of electrical conductivity in deionized water containing electrolyte stored at room temperature in four different commercially-available containers in accordance with exemplary embodiments of the present invention. The containers are three different transparent borosilicate glass bottles A, B, and C, and a transparent polycarbonate bottle D. The initial electrical conductivity of the deionized water is about 1 µS/cm when tapped. As shown in FIG. 4, the electrical conductivity of the deionized water increases with time when stored. Especially in the glass bottles, the increase of the electrical conductivity in the first week is 1.3 µS/cm or higher. Although the rate of the increase becomes reduced after the first week, the electrical conductivity still continues to increase up to 13 µS/cm after 200 days. The data shows that storage in plastic bottles leads to the slowest and smallest increase in conductivity over time. Thus, preferably the material of the container 244 shown in FIG. 2 in contact with the generated PMNCs will be a polymer or a plastic such as polycarbonate, polyethylene, polyethylene terephthalate, polyethylene terephthalate glycol-modified, or polystyrene. Use of such container material should further stabilize the electrical conductivity of the dispersion medium and PMNCs.

Conductivity adjustment step 304 may be performed by an in situ or ex situ way. Regarding controlling the electrical conductivity, for the ex situ case, it may be desirable to execute it immediately prior to the step of generating the nanoparticles when further exposure of the suspension liquid 212 to an external ion source is minimized. For the in situ case, in one exemplary embodiment, the PLAL system 200 shown in FIG. 2 may be equipped with the conductivity monitoring device 234.

To increase the electrical conductivity in suspension liquid 212, a solution of the above listed electrolyte such as KCl and NaOH may be added to the suspension liquid 212. To decrease the electrical conductivity in the suspension liquid 212, de-ionized or distilled water, probably containing a trace amount of electrolyte, of which the electrical conductivity is a few µS/cm or less may be added to the suspension liquid 212. For the in situ case, in one exemplary embodiment, the PLAL system 200 shown in FIG. 2 may have the conductivity adjustment system 230, in an upstream location, controlled by the controller 236. Another conductivity monitoring device 232 may be used to monitor an upstream the electrical conductivity of the suspension liquid 212 before the conductivity adjustment system 230. Receiving either one or both feedback data 238 and 240 from the conductivity monitoring device 232 and 234, the controller 236 controls the conductivity adjustment system 230 so that a required conductivity is stabilized in the suspension liquid 212 before PMNP generation by the PLAL take places.

In one exemplary embodiment, a system may be configured for automatic control of conductivity adjustment. Flow control from a first liquid may be controlled to increase conductivity, and from a second liquid to decrease conductivity. The controller 236 may be connected to a computer (not shown) which includes a program to monitor the electrical conductivity and, based upon calibration information, adjust the electrical conductivity. In alternative exemplary embodiments, semi-automatic or computer assisted control may be implemented.

At step 306, PMNPs 218 are generated by irradiating the laser beam 202 on the target 208. The generated PMNPs 218 are combined with the suspension liquid 212 to form a PMNC suspension 242.

A portion of the suspension liquid 212 in which the generated PMNPs 218 exist is in a form of a colloidal suspension, illustrated as the region 242 as shown in FIG. 2. The colloidal suspension 242 is collected and stored in the container 244 as an outcome of the step 306. A collection of the colloidal suspension 242 may be done after or during the step 306. For a circulation system, the colloidal suspension 242 may be taken at any suitable location through which the suspension liquid 212 moves from the inlet 226 to the outlet 228.

At step 308, a size distribution of the generated PMNPs or PMNCs is refined. FIG. 5A is a plot of particle sizes of AuNPs generated by the PLAL method in different conductivity electrolytes in accordance with exemplary embodiments of the present invention. A method of analytical ultracentrifugation, for example, CPS Disk CentrifugeDC24000 UHR from CPS Instruments, Inc. of Prairieville, La., is applied to measure the sizes of the AuNPs. The plotted size is the peak size of the measured particle sizes based on a weight distribution. As shown, the particle diameter becomes larger as ion concentration is lower. However, it is possible to produce 35 nm or larger particle sizes, with preferred particle sizes in the range from about 10 nm to about 30 nm of the AuNPs when the electrical conductivity in electrolyte is properly stabilized. C. Rehbock et al. reported the largest size of about 32 nm is made in 1 µM NaCl solution when the electrical conductivity is presumably lower than at least 0.5 µS/cm. However, the present invention indicates that 32 nm AuNPs may be made in an electrolyte solution having a conductivity of 1.5 µS/cm as shown in FIG. 5A. As a consequence, a presence of an excessive amount of ions in the electrolyte solution is suggested, which is causing a much higher conductivity of the electrolyte solution than that estimated from the known amount of NaCl. This is in direct contrast to the teaching of Rehbock et al. regarding ion concentration and particle size when the total ion concentration is properly estimated through the conductivity.

Although the PLAL method in a conductivity stabilized electrolyte produces the size (e.g., nanoparticle sizes) distribution with an accurately controlled size peak, the size distribution may still contain a secondary peak or a shoulder structure. To remove these particles having an undesirable size of the PMNPs, for example, a centrifugation may be applied to the PMNCs. For removal of the larger size of the PMNPs, the supernatant part may be taken from a centrifuged PMNC. Many PMNPs precipitate near the bottom of the centrifuge tube. Such a collection of PMNPs are referred to as pellets. For removal of the smaller part, the pellet part may be extracted from the centrifuged PMNC and then may be redispersed by adding an electrolyte solution or deionized water.

At step 310, the generated PMNCs are stored in a storage container under a proper storage condition before bioconjugation. The PMNCs generated by the PLAL method according to the present invention have the electrical conductivity below 20 µS/cm, mostly in the range from 1 µS/cm to 10 µS/cm. However, as shown in FIG. 4, the conductivity, even in deionized water alone, continues to increase with time when the water is stored in the storage container. Thus, the material of the storage container (e.g., the container 244 shown in FIG. 2) in contact with the generated PMNC preferably will be a polymer or a plastic such as polycarbonate, polyethylene, polyethylene terephthalate, polyethylene terephthalate glycol-modified, or polystyrene.

Dissolved gas can influence the resultant conductivity of the colloidal suspension, therefore the container may be purged and sealed under inert gas such as nitrogen or a noble gas such as a helium, neon, argon, or krypton atmosphere.

Regarding a storage temperature, the PMNCs will preferably be maintained at a temperature lower than 40° C., preferably lower than 25° C., more preferably lower than 15° C., such as 4° C., in a refrigerator, or the like.

Regarding a storage environment, exposure to sunlight should be avoided. Preferably, the container with the PMNCs is maintained in a dark place or a dark or amber colored container is used.

At step 312, the conductivity of the stored PMNC suspension is monitored and adjusted. Because bioconjugation processes are very sensitive to the ion concentration, an electrolyte conditioned specifically for the PMNC fabrication may have an effect on the subsequent bioconjugation process. Furthermore, leaching of ions from a storage container material, storage conditions, and storage temperature, also can influence the resultant colloidal stability of the bioconjugation. Thus, it is preferred that the ion conductivity be monitored and adjusted during storage in the storage container frequently enough to avoid a substantial variations in conductivity. By way of example, FIG. 4 provides information which can be utilized to determine the timeframe of any required adjustment periodicity. During a storage period the conductivity may exceed the preferred upper limit of 25 µS/cm. Thus, it is desirable to monitor and adjust the conductivity to remain within a pre-determined range as a control limit, and preferably below 25 µS/cm. This approach, in turn, may facilitate any adjustment made at or near a time in which a bioconjugation reaction is performed.

As described below, for a stable controllable bioconjugation, particularly with bio-molecules having molecular weight larger than 8500, the conductivity of the generated PMNCs needs to be maintained at lower than the 25 µS/cm limit. In order to keep conductivity lower than 25 µS/cm for about 4 months after generation of the PMNCs, the rate of conductivity increase is required to be 1.5 µS/cm or less per week, preferably 1 µS/cm or less per week, and more preferably 0.5 µS/cm or less per week. Thus, an electrical conductivity of the colloidal suspension is preferably less than 25 µS/cm, and may be in the range of from about 1 µS/cm-22 µS/cm, or about 1.5 µS/cm-15 µS/cm. As to changes in the conductivity, an increase of the electrical conductivity of a stored colloidal suspension in the storage container is preferably less than 1.5 µS/cm per week, more preferably less than 1 µS/cm per week, or even more preferably less than 0.5 µS/cm per week.

At step 314, the bioconjugation with the bio-molecules having molecular weights larger than 1500 may be performed.

The steps of the process 300 may be a continuous process in which the colloidal suspension is produced continuously.

The steps of the process 300 may be a batch process in which noninteractive steps are performed all at one time.

Figure 6:
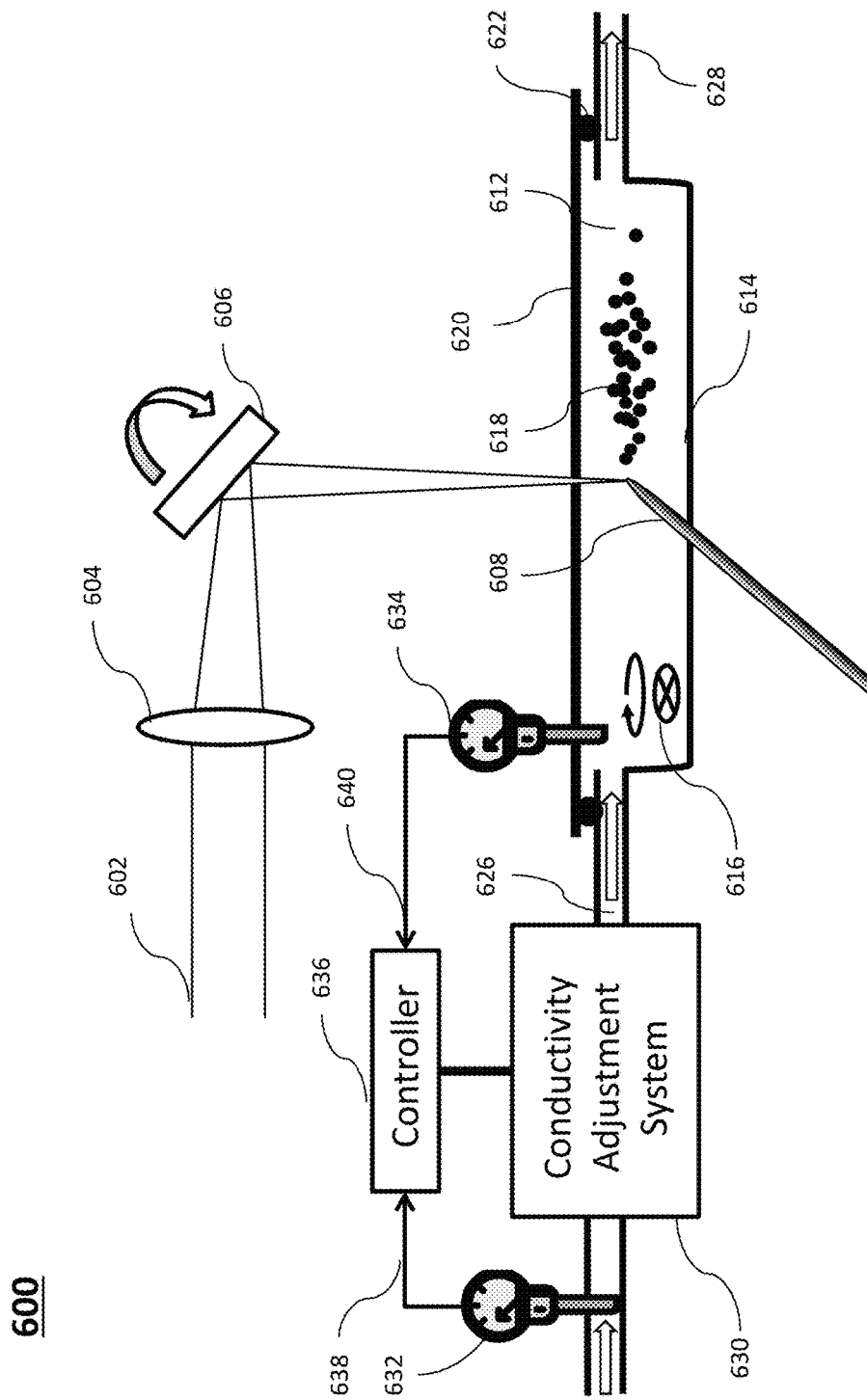
FIG. 6 is a schematic view of a laser based system for producing PMNCs for bioconjugation with a wire-shaped precious metal target using a PLAL method in accordance with exemplary embodiments of the present invention.

In an alternative embodiment of the PLAL method, a bulk target material may be a wire-shaped precious metal being fed into a liquid from outside as schematically shown in FIG. 6. As shown, laser based system 600 includes laser beam 602, lens 604, guide mechanism 606, wire bulk target 608 for ablation, suspension liquid 612, container 614, stirring bar 616, generated PMNPs 618, optical window 620, O-ring seal 622, inlet 626, outlet 628, conductivity adjustment system 630, conductivity monitoring devices 632, 634, and controller 636. The difference between the embodiments of FIG. 2 and FIG. 6 is that the bulk target 208 may be replaced by the wire shaped bulk target 608. The wire bulk target 608 may feed into the container 614 so that the head of the wire bulk target 608 is maintained in the focal volume of the laser beam 602. Thus, the laser based system 600 does not include a motion stage. In one exemplary embodiment, the wire bulk target 608 for ablation is a piece of gold wire.

PMNC Generation by Chemical Method

Figure 7:
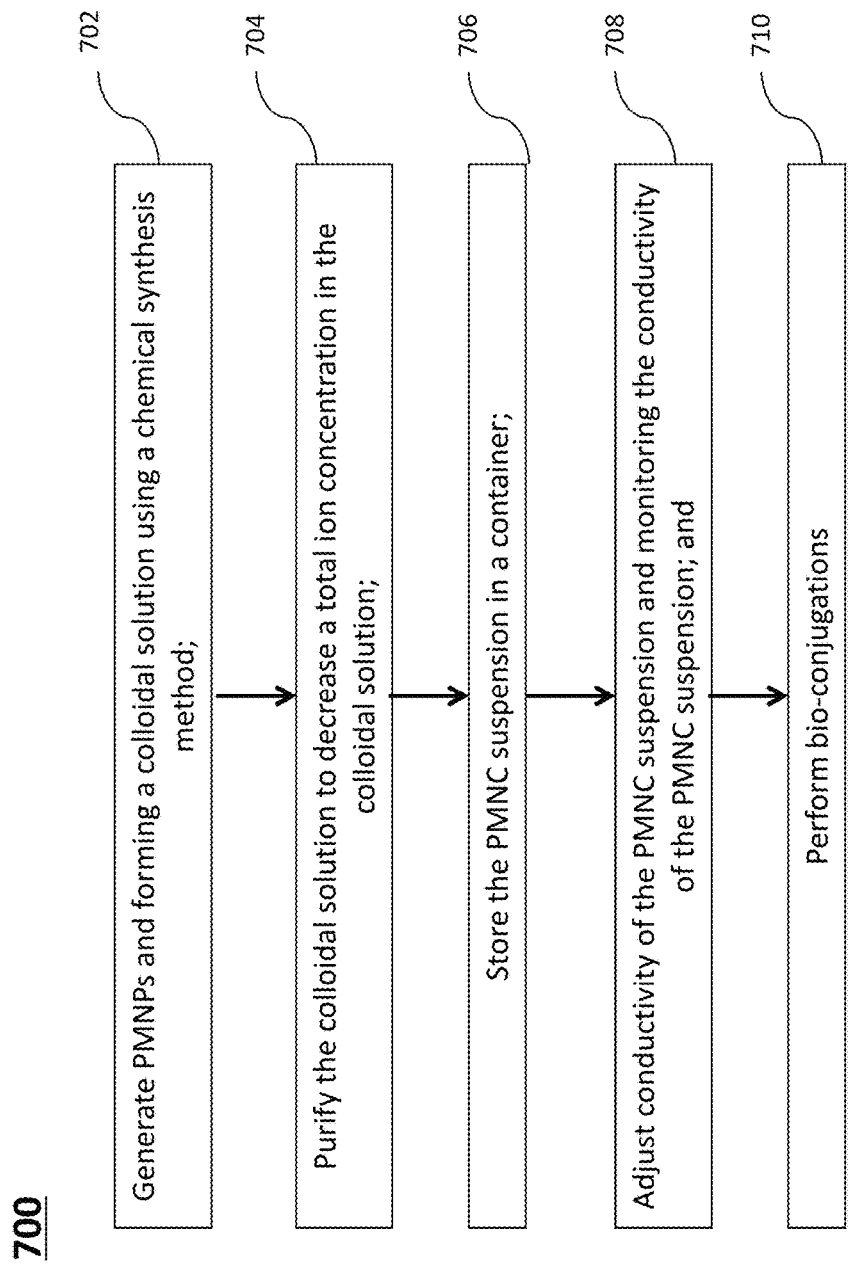
FIG. 7 is a flowchart showing a process from preparation of nanoparticles to bioconjugation based on synthesis of nanoparticles by a chemical method in accordance with exemplary embodiments of the present invention.

FIG. 7 is a flowchart showing a process from preparation of nanoparticles to bioconjugation based on synthesis of nanoparticles by a chemical method in accordance with exemplary embodiments of the present invention. Herein, the chemical method refers to a method of purification of chemically synthesized nanocolloids (PCSNC).

PCSNC process 700 starts with a preparation of PMNPs or a colloidal solution (e.g., PMNCs) through a chemical synthesis method at step 702 that is known, as shown in FIG. 1A. At step 704, a purification process is followed to decrease the total ion concentration in the colloidal solution, since the chemically-synthesized PMNCs contain a large amount of electrolyte ions, such as residual reduction reaction by-products and additives, which are used to stabilize the colloidal system. Exemplary purification processes include, but are not limited to, centrifugation, dialysis, electrodialysis, or ultra-filtration. A purification process based on centrifugation is discussed below. The other three processes are described in detail in "Engineering Chemistry" by R. Mukhopadhyay and S. Datta from New Age International Publishers, page 278-291, (2007).

Figure 8:
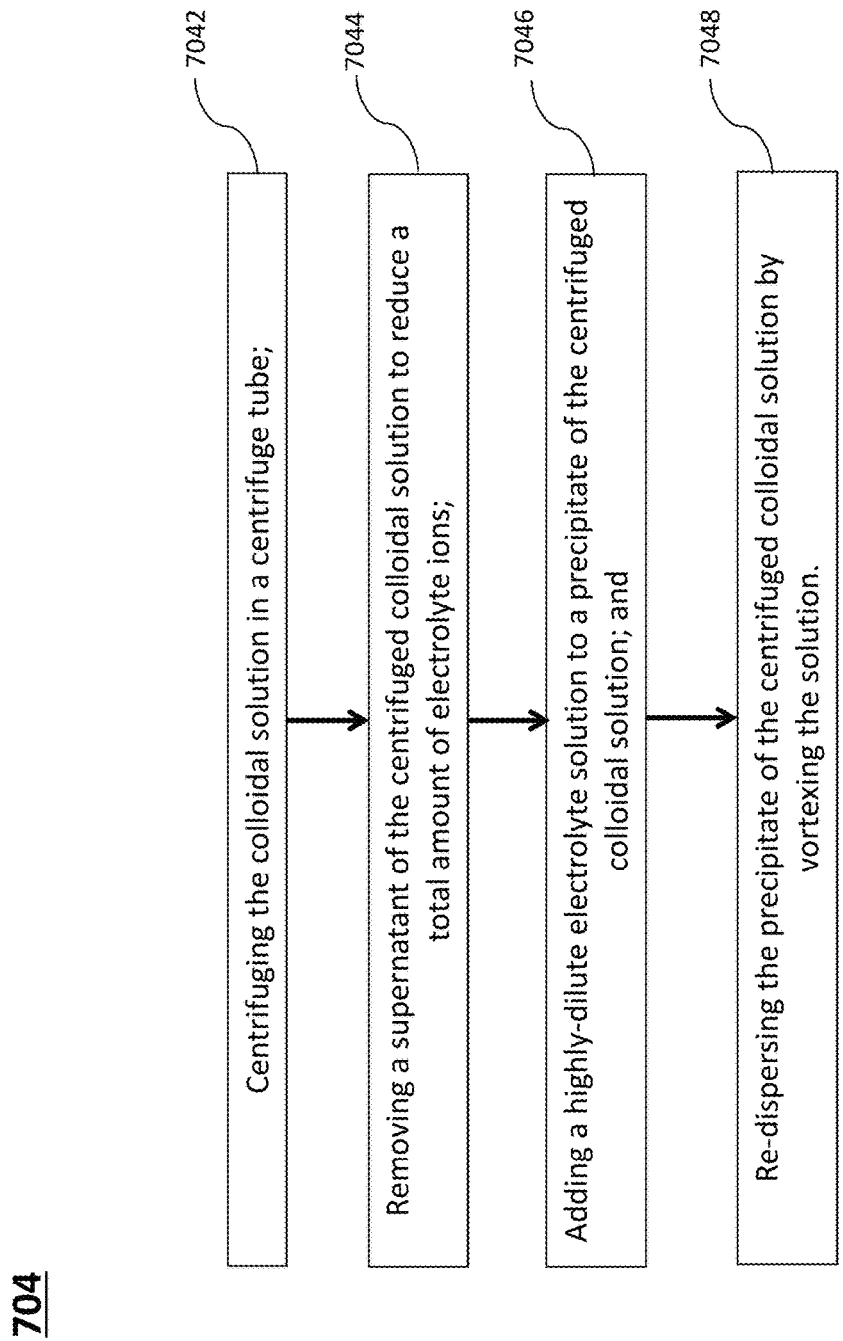
FIG. 8 is a flowchart showing a centrifuge-based purification process 704 for the nanoparticles synthesized by the chemical method shown in FIG. 7 in accordance with exemplary embodiments of the present invention.

FIG. 8 is a flowchart showing the centrifuge-based purification process step 704 from FIG. 7 in accordance with exemplary embodiments of the present invention. At step 7042, a PMNC solution prepared by a chemical synthesis method is placed in a centrifuge tube. Then, the PMNC solution is centrifuged in a centrifugal device. By choosing a proper centrifugal condition, for example about 8000 G for 20 minutes most of the PMNPs precipitate to the bottom of the centrifuge tube, once collected they can be re-dispersed without particle aggregation, as discussed above. At step 7044, the total amount of electrolyte ions in the colloidal solution is reduced by the removal of the supernatant of the centrifuged PMNC solution. At step 7046, a highly-dilute electrolyte solution, such as deionized water, is added to the precipitate of the centrifuged PMNC solution making the density of PMNPs in the solution close to that of the initially prepared PMNCs. Finally, the precipitated PMNPs are re-dispersed by creating a vortex in the solution at step 7048. When dilution is made by deionized water, the rate of electrolyte dilution through the whole procedure is approximately defined by the ratio of the total volume of solution after step 7048 to the volume of the part remaining after removing the supernatant in step 7044. For example, if 0.9 ml of deionized water is added to 0.1 ml of the remaining solution precipitate in step 7046, the electrolyte is ten times diluted.

Depending on the dilution rate, the entire procedure of the centrifugation may be repeated starting with the PMNCs obtained after step 7048 as the prepared colloidal solution, so that the required conductivity is obtained in the conductivity adjustment and monitoring step 708 in FIG. 7.

Returning to FIG. 7, the purification process 704 may be a part of conductivity adjustment step 708, but a finer adjustment of the conductivity may be executed by the above listed methods (e.g., dialysis, electrodialysis, ultra-filtration, etc.) for the purification process 704 to decrease the value of the conductivity or by addition of electrolyte to increase the value of the conductivity.

In general, the purification process 704 decreases the conductivity in the colloidal solution, but if the increase of the conductivity is necessary, it can be done by adding a trace amount of electrolyte such as NaCl and KCl or their electrolyte solutions to the colloidal suspension during step 706.

Figure 9:
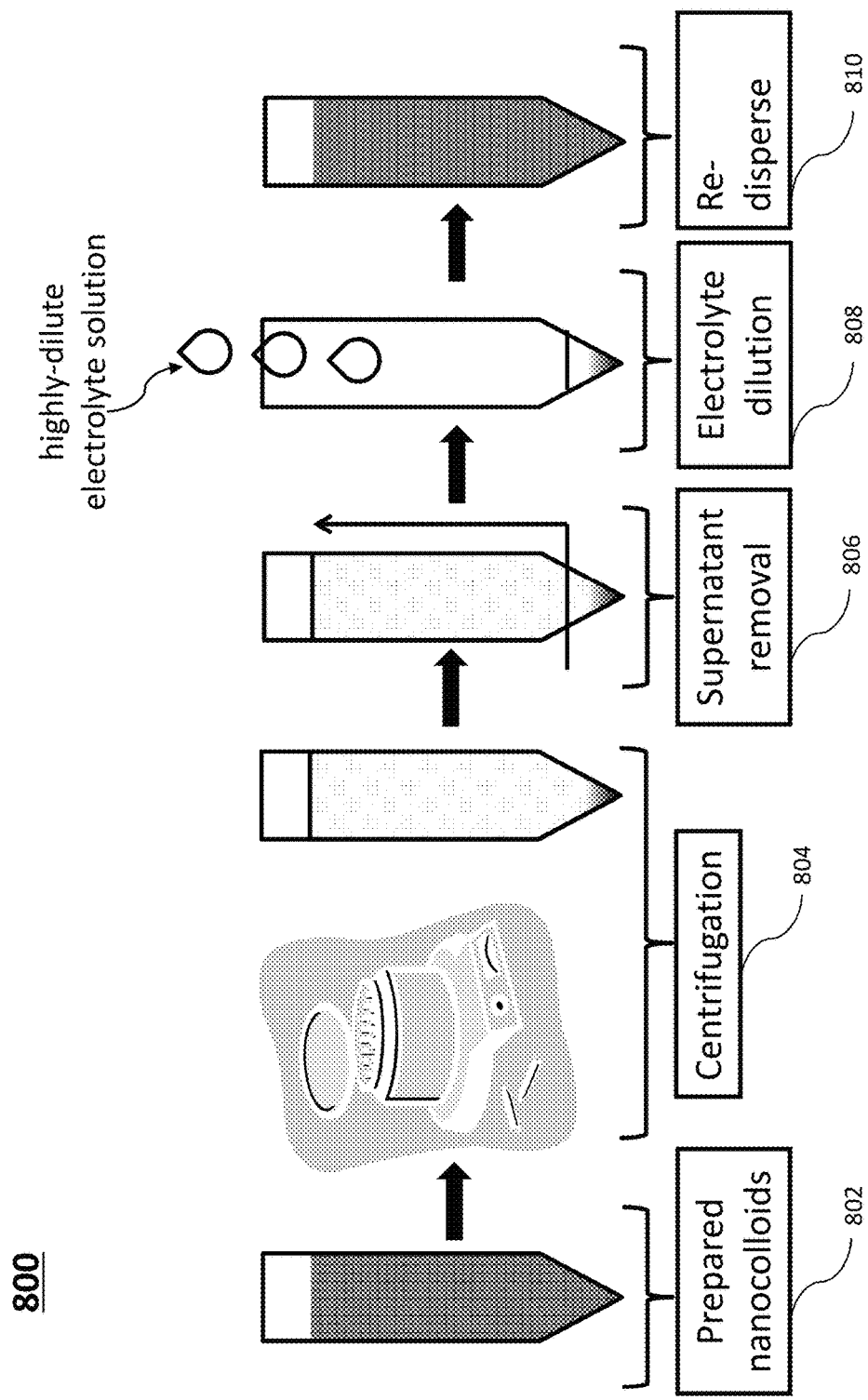
FIG. 9 is a block diagram showing a centrifuge-based purification process for gold nanoparticles (AuNPs) synthesized by a chemical method in accordance with exemplary embodiments of the present invention.

In one exemplary embodiment, the PMNCs are gold nanocolloids (i.e., AuNCs). Hereafter described is the exemplary embodiment of purification process 800 applying the centrifugation method to chemically-synthesized AuNCs, as shown in FIG. 9. FIG. 9 is a block diagram showing a centrifuge-based purification process for gold nanoparticles (AuNPs) synthesized by a chemical method in accordance with exemplary embodiments of the present invention.

Purification process 800 of FIG. 9 starts with providing AuNCs at step 802. The AuNCs may be a commercially-available AuNC solution, which is synthesized by a citrate reduction method, available from Ted Pella, Inc. of Redding, Calif. The mean particle diameter of the AuNPs is 20.1 nm. The optical density at a wavelength of 520 nm is 1.04. Gold chloride concentration is 0.01%. The number of particles per milliliter (ml) is $7.00 \times 10^{11}$. The molar particle concentration is $1.16 \times 10^{-9}$ M (1.16 nM). The mass of gold per ml is 56.6 mg. The measured conductivity ($\sigma$) in the original AuNC solution is 327 µS/cm. At step 804, a total of 36 ml of the AuNC solution is split and transferred in equal amounts into twenty four 1.5 ml centrifuge tubes that are centrifuged at 8000 G for 20 minutes. Then, 1.4 ml of supernatant of the centrifuged AuNC solution is removed from each centrifuge tube (step 806). At step 808, each tube is refilled with 1.4 ml of deionized water having a conductivity of about 1 µS/cm. At step 810, all tubes are placed in a vortex mixer to mix the precipitation of the centrifuged AuNC solution with the deionized water, thereby producing a re-dispersed colloidal solution of AuNC with reduced electrolyte levels.

The procedures from step 804 to step 810 are then repeated twice. All of the solution in the twenty four tubes is finally collected together and stored in a capped plastic bottle. After the purification process 800, the AuNC solution has a conductivity of 2.5 µS/cm, this is much lower than the initial conductivity of 327 µS/cm.

Figure 10:
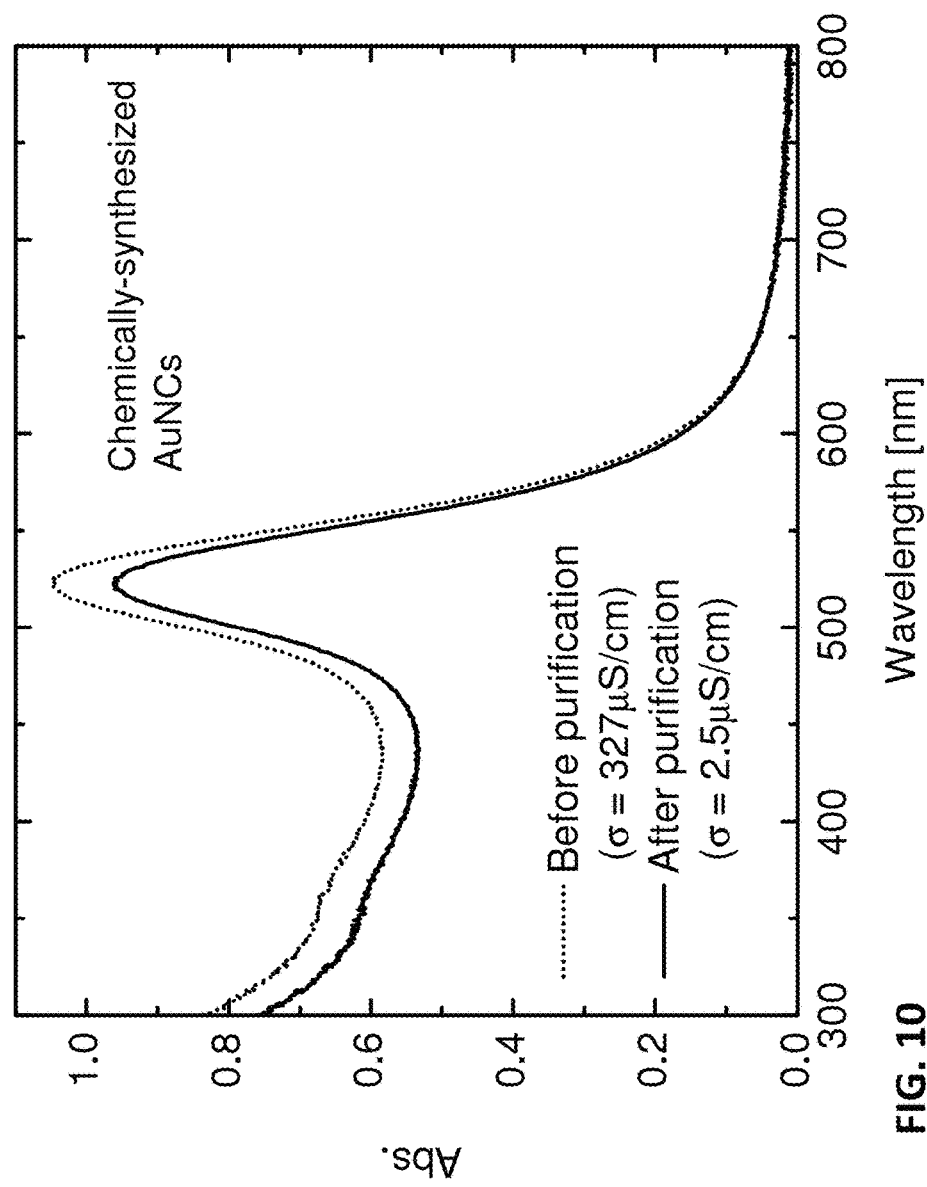
FIG. 10 is a plot of UV-Vis absorbance (optical density) of commercially-available chemically synthesized AuNCs shown in FIG. 9 before and after the centrifuge-based purification process in accordance with exemplary embodiments of the present invention.

FIG. 10 is a plot of UV-Vis absorbance (optical density) of commercially-available chemically synthesized AuNCs shown in FIG. 9 before and after the centrifuge-based purification process in accordance with exemplary embodiments of the present invention. As shown, an optical density of 0.96 is obtained at 520 nm after the purification, corresponding to a 92.3% yield. The estimated number of particles per ml is $6.46 \times 10^{11}$. The molar particle concentration is $1.07 \times 10^{-9}$ (1.07 nM).

Returning to FIG. 7, in step 706, the PMNC suspension is stored in a storage container. Here, the "storage" step 706 is similar to the storage step 310 of the PMNCs generated by the PLAL method, as shown in FIG. 3. In order to keep conductivity of the PMNC suspension lower than 25 µS/cm for about 4 months storage time after generation, the rate of conductivity increase is required to be 1.5 µS/cm or smaller per week, preferably 1 µS/cm or smaller per week, and more preferably 0.5 µS/cm or smaller per week.

Similar to the storage of the PMNCs generated by the PLAL method, a material of the storage container in contact with the fabricated PMNC solution will preferably be a polymer or plastic such as polycarbonate, polyethylene, polyethylene terephthalate, polyethylene terephthalate glycol-modified and polystyrene.

The storage temperature of the PMNCs should be at least lower than 40° C., preferably in lower than 25° C., the most preferably in lower than 10° C. such as in a refrigerator kept at 4° C.

The storage environment of the PMNCs should avoid exposing them to the sunlight. Preferably, the container with the PMNCs is kept in a dark place or the container shields the PMNCs from external light.

Furthermore, the storage container may be purged and sealed under inert gas such as nitrogen or a noble gas such as a helium, neon, argon, or krypton atmosphere, to minimize the influence of dissolved gas on the resultant conductivity in the colloidal suspension.

At step 708, the conductivity of the stored colloidal suspension is monitored and adjusted. Here, the "monitoring and adjustment" step 708 is the same as the monitoring and adjustment step 312 of the PMNCs prepared by the PLAL method, as shown in FIG. 3.

At step 710, the bioconjugation with the bio-molecules having molecular weight larger than 200 may be performed. Here, the "bioconjugation" step 710 is the same as the bioconjugation step 312 of PMNCs prepared by the PLAL method, as shown in FIG. 3.

As described below, for a stable controllable bioconjugation, particularly with bio-molecules having a molecular weight of 8500 and larger, the conductivity of the generated PMNCs should be maintained at lower than 25 µS/cm.

Bioconjugation Examples and Experimental Results

Bio-conjugation is performed by utilizing a colloidal suspension of PMNPs together with target molecules or bio-molecules containing various chemical functional groups, a suitable characteristic thereof being a high affinity for the surface of gold nanoparticles. Examples of such functional groups include thiol, amine, and phosphine. A solution which contains the PMNPs and target molecules is mixed and left undisturbed in a suitable environment for a period long enough for the target molecules to bond with the PMNPs. The reaction process can be monitored, for example, by following the particle size change as binding of the target molecule to the PMNP occurs as measured by dynamic light scattering, described in U.S. Patent Application Pub. No. 2012/0225021. For example, and as will be discussed below, at least 24 hours at room temperature may provide a sufficient amount of time for the certain molecules to be conjugated onto the surfaces of the AuNPs. At least one of the effects of the present invention is found in the colloidal stability during a bioconjugation process when the surface of PMNPs is partially functionalized. One useful example of bioconjugation is conjugation with thiolated PEG, hereinafter referred as to PEGylation Several aspects related to formation of PMNPs, particularly AuNPs, and the surface modification and/or functionalization of the nano-particles are disclosed in commonly owned U.S. Patent Application Pub. No. 2012/0225021 ('021). As discussed in '021, among the molecules used for surface functionalization of gold nanoparticles, polyethyleneglycol (PEG), or more specifically thiolated polyethyleneglycol (SH-PEG), is one of the more important and widely used species. As discussed elsewhere in the present specification many other ligands can be used to functionalize the present colloidal gold preparations including aptamers, generally through binding at a thiol functionality linked to the aptamer. PEG is a linear polymer consisting of repeated units of —$CH_2$—$CH_2$—O—. Depending on the molecular weight, the same molecular structure is also termed poly(ethylene oxide) or polyoxyethylene. The polymer is very soluble in a number of organic solvents as well as in water. After being conjugated onto the surfaces of AuNPs, in order to maximize entropy, the PEG chains have a high tendency to fold into coils or bend into a mushroom like configuration with diameters much larger than proteins of the corresponding molecular weight. The surface modification of gold nanoparticles with PEG is often referred to as 'PEGylation' and in the present specification and claims binding of PEG to gold nanoparticles will be referred to as PEGylation. Since the layer of PEG on the surface of AuNPs can help to stabilize the gold nanoparticles in an aqueous environment by providing a steric barrier between interacting gold nanoparticles, PEGylated gold nanoparticles are much more stable at high salt concentrations. In addition, the ethylene glycol functional group in the PEG is known to interact well with water molecules and so when the PEG molecules are conjugated onto the surface of the gold nanoparticles, the spaces between the PEG chains can attract water molecules to create a hydrophilic layer of water molecules around the gold nanoparticles. This results in an inert hydrophilic surface with less 'stickiness', which prevents PEGylated gold nanoparticles from being recognized and eliminated by the human reticuloendothelial system (RES) from the systemic blood circulation before reaching their targeted sites of interest through passive targeting based on the enhanced permeation and retention mechanism or active targeting with the aid of a targeting moiety and performing their intended functions. The PEG chains also provide reactive sites for adding other targeting or signaling functionality to PEGylated AuNPs prepared according to the present invention. These reactive sites can be used to bind fluorescent markers for detection and signaling functions. Since PEGylation is currently a very effective means to enhance stability and solubility of gold nanoparticles, prolong circulation time, minimize non-specific binding, and improve specific targeting to the sites of interest, conjugation of AuNPs prepared according to the present invention to SH-PEG is disclosed below as one example of surface modification of PMNPs.

However, an excess amount of target molecules are required to carry out the bioconjugation without inducing instability of the colloidal suspension. In the case of the PEGylation, as disclosed in '021, if the total amount of the molecules is smaller than that required to form a monolayer where the available surface on the nanoparticles is occupied by the molecules, it may cause the colloidal systems to become unstable, resulting in the aggregation or precipitation of the nanoparticles, or the nanoparticle deposition onto the surface of the container. In case of the PMNPs having a surface plasmon resonance in visible light wavelength region such as AuNPs and AgNPs, the induced instability can be observed by the decrease in optical absorbance or the colorimetric change of the colloidal solution because of the aggregation, precipitation, or the deposition. Hereafter the effects are demonstrated using two types of AuNCs prepared by the PLAL and PCSNC methods according to the present invention.

For the stability test, two types of the AuNCs having a nanoparticle size peak around 20 nm, AuNCs-PLAL and AuNCs-PCSNC, were prepared by the PLAL and PCSNC methods, respectively, according to the present invention. The initial conductivity in the AuNCs-PLAL and AuNCs-PCSNC were 2.33 µS/cm and 2.54 µS/cm, respectively. The size peak absorbance in UV-Vis spectrum was 1.00 at 520 nm for the AuNCs-PLAL and 0.96 at 520 nm for the AuNCs-PCSNC. Estimated molar particle concentration in the AuNCs-PLAL and the AuNCs-PCSNC were $1.11 \times 10^{-9}$ (1.11 nM) and $1.07 \times 10^{-9}$ (1.07 nM), respectively. In various embodiments, for bioconjugation of PMNPs, a concentration of the PMNPs in a colloidal suspension may be greater than 0.01 nM or greater than 0.1 nM, and up to 100 nM, which is the largest value being related to a colloidal stability and the proximity of the PMNPs in the colloidal system.

For the purpose of showing a significant influence of the conductivity on the bio-conjugation process, each of the two AuNCs was split into six samples and the conductivities of the six samples were adjusted to obtain six different values by adding a mixture of deionized water and 2.5 mM NaCl solution. Here the deionized water has a conductivity of 1 µS/cm and the NaCl solution has a conductivity of 320 µS/cm.

The final conductivity before a PEGylation process is listed on Table 3.

TABLE 3

| | AuNCs | | | |
|---|---|---|---|---|
| | AuNCs-PLAL | | AuNCs-PCSNC | |
| | PEG | | | |
| | PEG MW 8500 | PEG MW 20000 | PEG MW 8500 | PEG MW 20000 |
| Sample #1 | 2.42 µS/cm | 2.42 µS/cm | 2.08 µS/cm | 2.11 µS/cm |
| Sample #2 | 4.78 µS/cm | 4.78 µS/cm | 6.89 µS/cm | 7.15 µS/cm |
| Sample #3 | 7.19 µS/cm | 7.19 µS/cm | 11.81 µS/cm | 11.73 µS/cm |
| Sample #4 | 12.12 µS/cm | 12.12 µS/cm | 16.88 µS/cm | 16.96 µS/cm |
| Sample #5 | 16.98 µS/cm | 16.98 µS/cm | 21.23 µS/cm | 21.83 µS/cm |
| Sample #6 | 21.98 µS/cm | 21.98 µS/cm | 26.65 µS/cm | 26.47 µS/cm |

Each of the above listed 24 samples was further split into four 0.9 ml-volume samples for different thiolated PEG concentrations of 0 (control), 20 nM, 40 nM and 60 nM.

As a bio-molecule, two types of thiolated PEG (SH-PEG) with molecular weights (MW) of 8500 and 20000, from Laysan Bio of Arab, Ala., were used without further purification and the PEGylation was carried out by adding 0.1 ml of the thiolated PEG solution with different concentrations of PEG to the AuNCs samples, resulting in a total 1 ml volume of the mixed solution with PEG concentrations of 0 for control, 20 nM, 40 nM and 60 nM. In various embodiments, for bioconjugation of the PMNPs, functional ligand molecules may have a molecular weight greater than 200, or greater than 8500, and up to about 1,000,000. The value of 1,000,000 represents anti-bodies to be attached to a PMNP.

The final ratios between the number of thiolated PEG molecules and the number of AuNPs in the mixed solution for the AuNCs-PLAL samples with PEG concentrations of 0 (control), 20 nM, 40 nM and 60 nM were 0, 20:1, 40:1 and 60:1, respectively. For the AuNCs-PCSNC samples with PEG concentration of 0 (control), 20 nM, 40 nM and 60 nM, the final ratios were 0, 19:1, 39:1 and 58:1, respectively.

The range of the PEG concentration from 0 to 60 nM was chosen because for the PEGylation the signature of the colloidal instability becomes the most pronounced when the ratio of the number of PEG molecules to the AuNPs is less than 100:1.

After mixing, each solution was kept undisturbed for at least 24 hours at room temperature of approximately 25° C. to provide a sufficient amount of time for the PEG molecules to be conjugated onto the surfaces of the AuNPs via Au-thiol bonding before characterizing the colloidal stability of the Au nanoparticles under PEGylation.

The colloidal stability under PEGylation was evaluated by measuring the UV-VIS absorption spectroscopy, which is considered to be an appropriate technique due to the existence of intense localized surface plasmon resonance (SPR) of AuNPs around 520 nm. The aggregation, precipitation, or the deposition of AuNPs under PEGylation will be reflected by a decrease of the absorption around 520 nm or the increase of the absorption around 650 nm.

Figure 11:
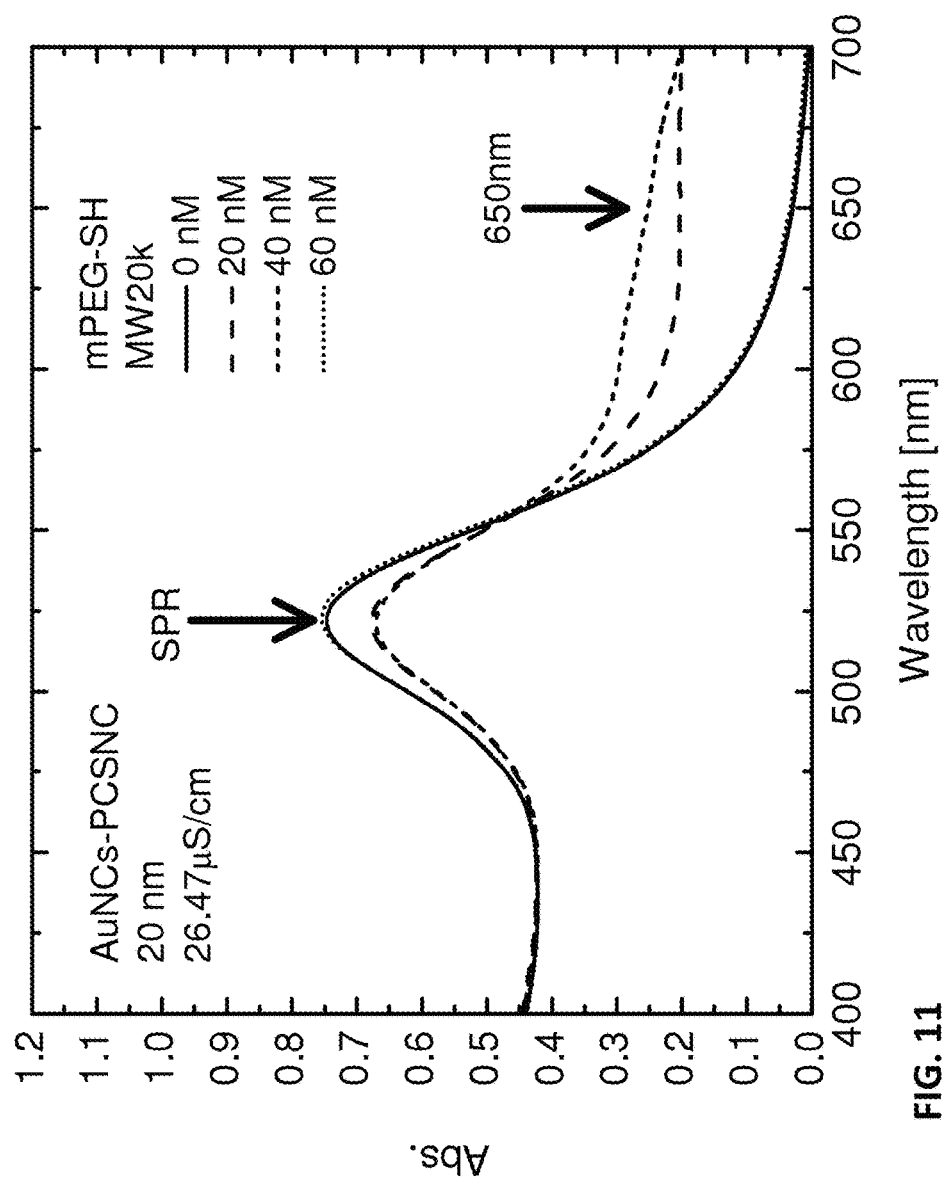
FIG. 11 is a plot of evolution of UV-Vis spectrum for AuNCs-PCSNC with different concentrations of PEG MW20000 in accordance with exemplary embodiments of the present invention.

FIG. 11 is a plot of the UV-Vis spectra for AuNCs-PCSNC with different concentrations of PEG MW20000 in accordance with exemplary embodiments of the present invention. As shown, the UV-Vis spectrum of the sample #6 for AuNCs-PCSNC with the different concentrations of PEG MW20000 is shown to exemplify how the signature of the induced colloidal instability may be recognized in the spectrum.

With the addition of the PEG MW20000 molecules, absorbance at 650 nm increases accompanying the decrease in absorbance at the wavelength of surface plasmon resonance (SPR) around 520 nm. For the AuNCs, the increase in absorbance around 650 nm is attributed to the aggregation of the AuNPs, which is one of the signatures of the colloidal instability. If the ratio of absorbance at 650 nm to absorbance at SPR approaches 0.2, the induced instability can be visually recognized by a color change in the colloidal solution. Although not necessary to the practice of embodiments of the present invention to understand underlying operation mechanism, we found the colloidal instability is sometimes induced when the stabilization mechanism for the colloidal system is altered from that based on the electric double layer repulsion, which is due to the surface charge on the nanoparticle, to that based on the steric repulsion, which is achieved by conjugating with a ligand molecule such as PEG. During the repulsion mechanism transition, there seems to be an unstable region where neither of the two different stabilization mechanisms are sufficient to maintain the colloidal stability. For example, for PEGylation with AuNPs having about 15-20 nm size, this unstable region is found when the ratio of the number of PEG molecules to the AuNPs is less than 100:1.

Figure 12:
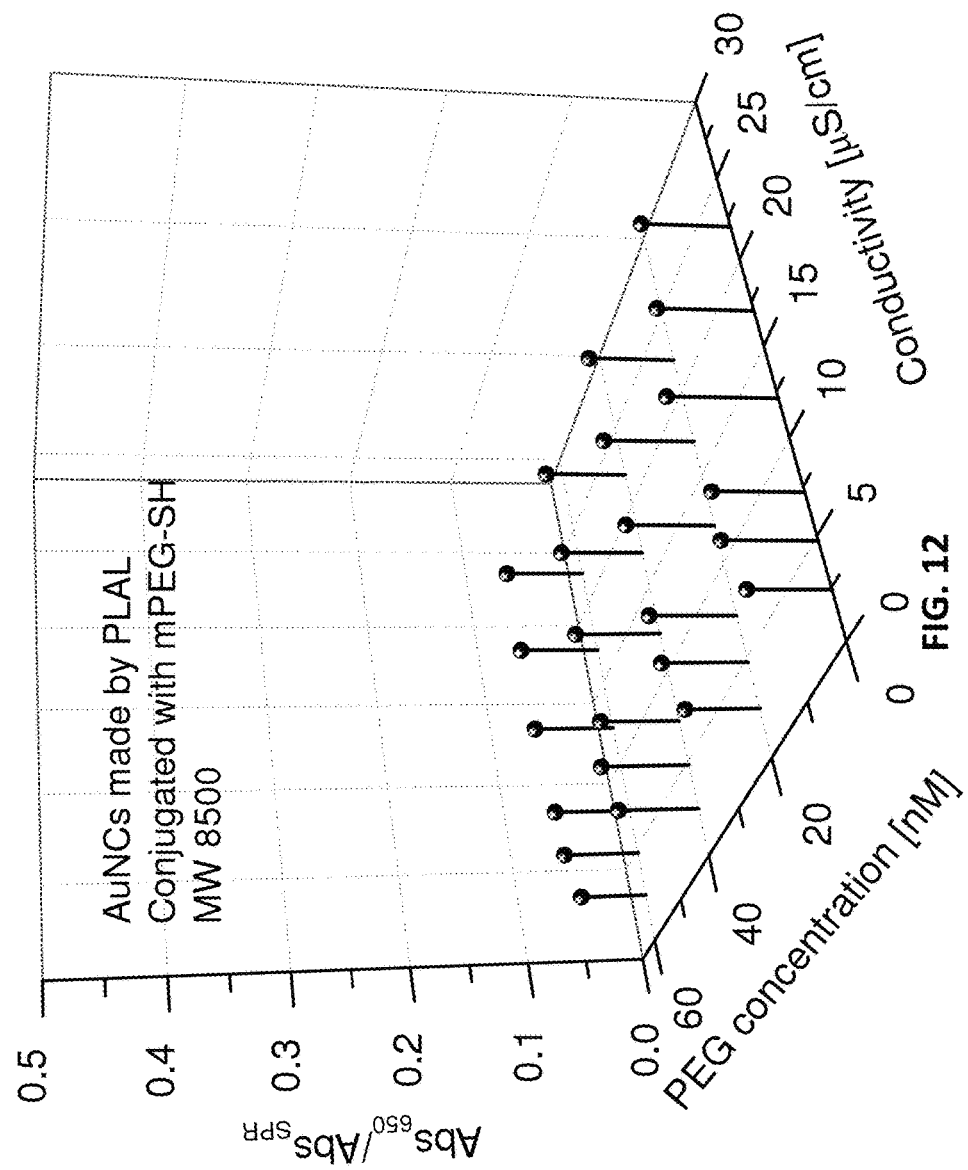
FIG. 12 is a plot showing experimental results for a combination of AuNCs made by a PLAL method and conjugated with mPEG-SH MW 8500 molecules at various electrical conductivities and levels of mPEG-SH MW 8500 in accordance with exemplary embodiments of the present invention.
Figure 13:
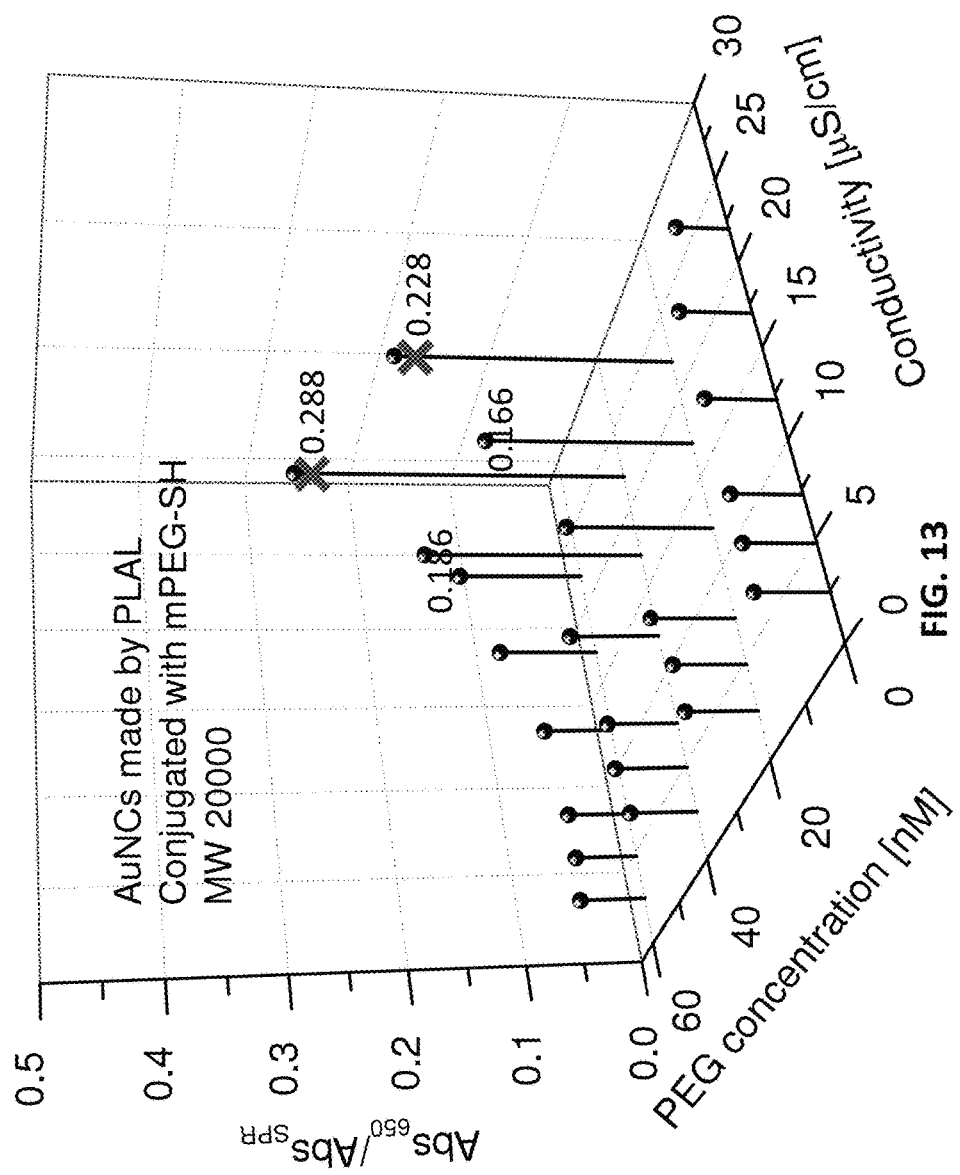
FIG. 13 is a plot showing experimental results for a combination of AuNCs made by a PLAL method and conjugated with mPEG-SH MW 20000 molecules at various electrical conductivities and levels of mPEG-SH MW 20000 in accordance with exemplary embodiments of the present invention.
Figure 14:
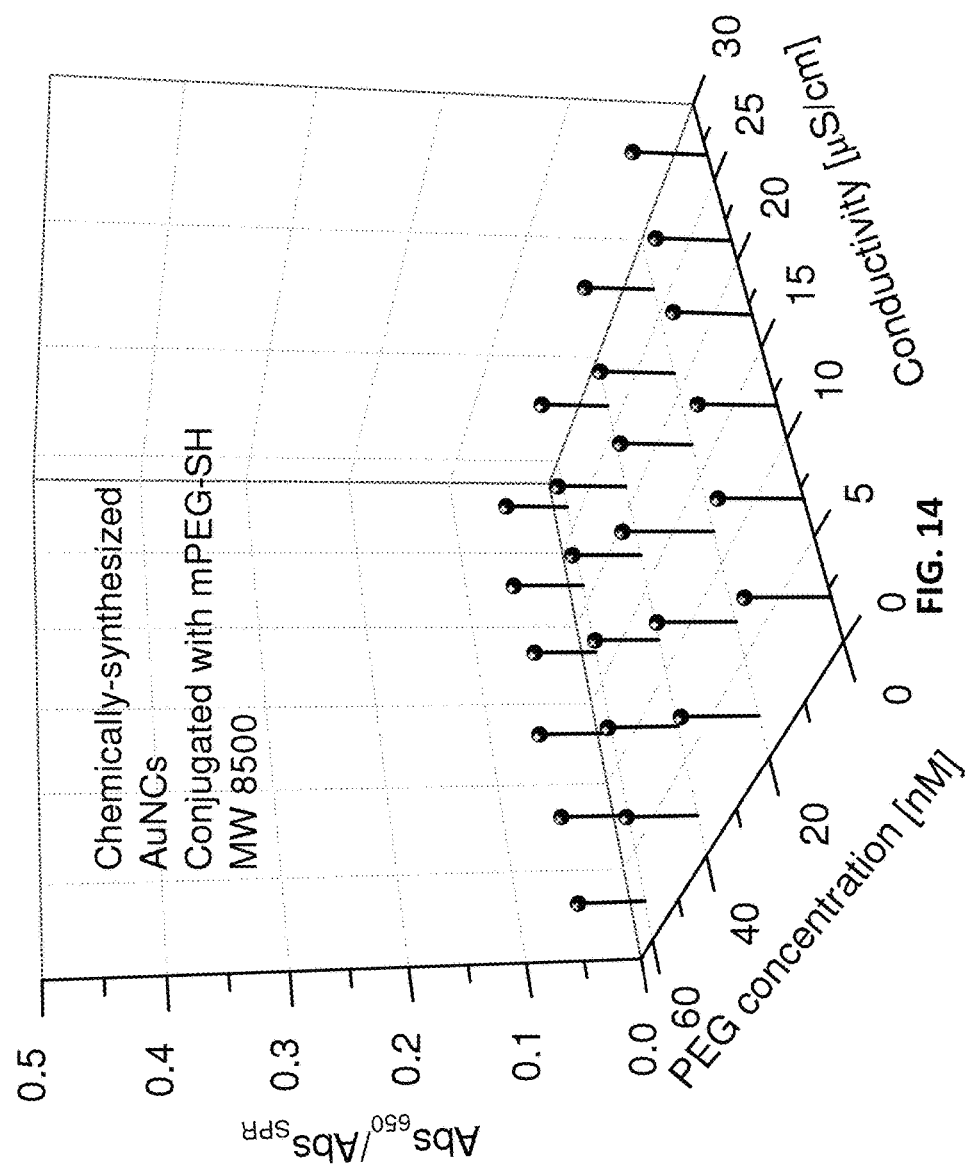
FIG. 14 is a plot showing experimental results for a combination of AuNCs made by a chemical synthesis method and conjugated with mPEG-SH MW 8500 molecules at various electrical conductivities and levels of mPEG-SH MW 8500 in accordance with exemplary embodiments of the present invention.
Figure 15:
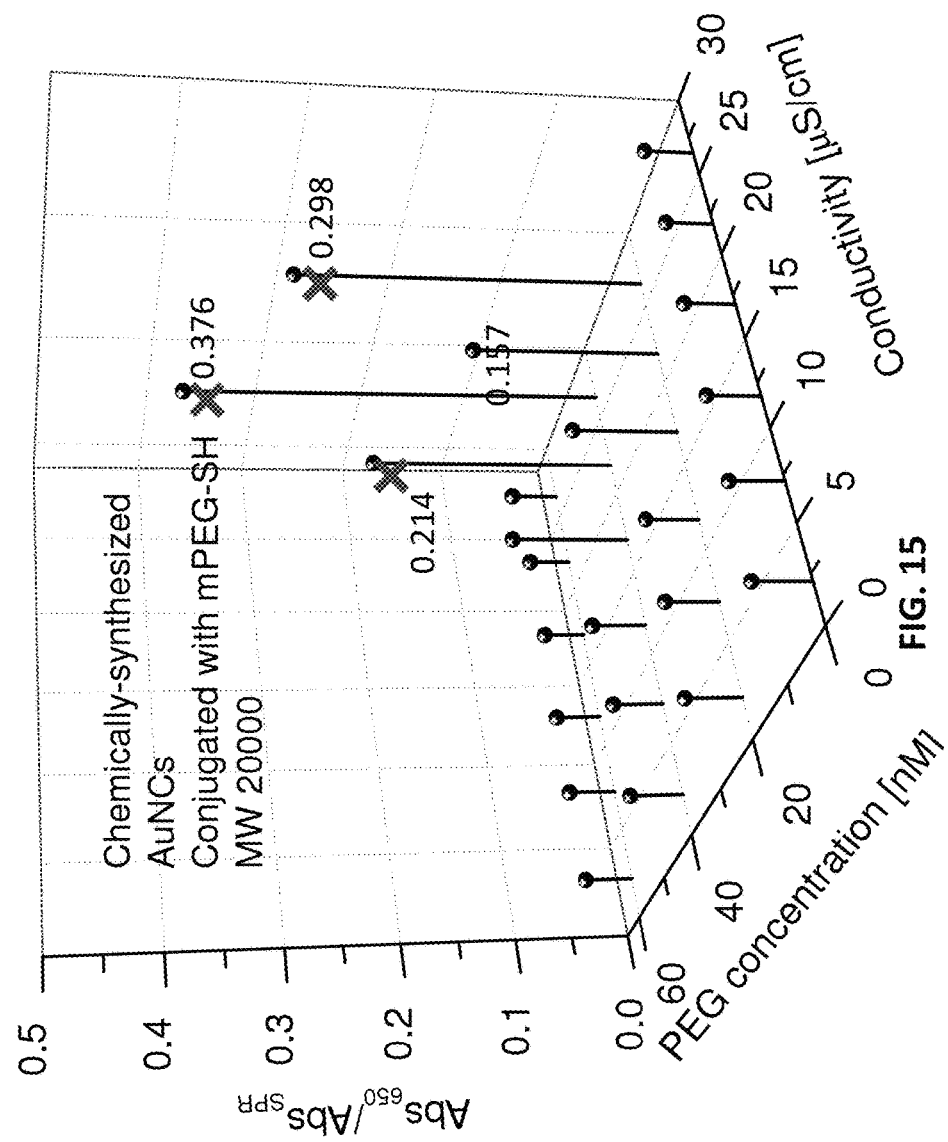
FIG. 15 is a plot showing experimental results for a combination of AuNCs made by a chemical synthesis method and conjugated with mPEG-SH MW 20000 molecules at various electrical conductivities and levels of mPEG-SH MW 20000 in accordance with exemplary embodiments of the present invention.

Depending on the situation, the colloidal instability may be recognized as the precipitation of the nanoparticles or the deposition of nanoparticles onto the container surface, resulting in the decrease of absorbance in the colloidal solution. The stability of the colloidal system is relevant to the range of conductivity. The stability for the AuNCs to quantitatively specify the range of conductivity takes into account the above three signatures of induced colloidal instability, i.e. nanoparticle aggregation, nanoparticle precipitation and deposition of nanoparticles onto the container surface. The ratio of absorbance at 650 nm to absorbance at SPR in the correlation with PEG concentration and the conductivity is summarized in FIGS. 12-15 for all the combinations of the two types of the AuNCs with the two kinds of the PEG molecules. FIGS. 12 and 13 are for AuNCs-PLAL with PEG MW8500 and PEG MW20000, respectively. FIGS. 14 and 15 are for AuNCs-PCSNC with PEG MW8500 and PEG MW20000, respectively.

FIG. 12 is a plot showing experimental results for a combination of AuNCs made by a PLAL method and conjugated with mPEG-SH MW 8500 molecules in accordance with exemplary embodiments of the present invention. FIG. 13 is a plot showing experimental results for a combination of AuNCs made by a PLAL method and conjugated with mPEG-SH MW 20000 molecules in accordance with exemplary embodiments of the present invention. FIG. 14 is a plot showing experimental results for a combination of AuNCs made by a chemical synthesis method and conjugated with mPEG-SH MW 8500 molecules in accordance with exemplary embodiments of the present invention. FIG. 15 is a plot showing experimental results for a combination of AuNCs made by a chemical synthesis method and conjugated with mPEG-SH MW 20000 molecules in accordance with exemplary embodiments of the present invention.

For Au nanocolloids the stability criterion requires that both of the following two conditions are satisfied:

i). The change of optical absorbance at wavelength of surface plasmon resonance (SPR), which is typically around 520 nm for about 15-20 nm size AuNPs, is within plus/minus 15% based on the control absorbance;

ii). The ratio of (absorbance at 650 nm)/(absorbance at SPR)<0.2.

For all samples examined for the bioconjugation, the first requirement i) is fulfilled so that the range of the colloidal stability is determined by the second requirement ii). From FIG. 12 to FIG. 15, it is seen that the second requirement of the stability is fulfilled at all measured points for PEG MW8500. In all cases the ratio of absorbance at 650 nm to absorbance at SPR is less than 0.2. For the samples using PEG 20000 there is threshold conductivity around 25 µS/cm for PEG MW20000, below which the ratio of absorbance at 650 nm to absorbance at SPR is suppressed to lower than 0.2, regardless of the AuNCs-PLAL or AuNCs-PCSNC, i.e. regardless of how the AuNCs are made. Also, it is seen that the AuNCs having lower conductivity are more stable during the bioconjugation process.

Although the above results are just for demonstrative purposes, from the experimental data it is found that bioconjugation is very sensitive to the total ion concentration in the suspension and it is beneficial to optimize the total ion concentration by monitoring and adjusting the conductivity of the colloidal solution. For example, in case of the PEG, it is expected that the lower conductivity provides for a stable bioconjugation if the bio-molecule has a molecular weight larger than 8500.

In the data described in this specification, thiolated PEG with MW20000 molecules or thiolated PEG with MW8500 molecules were used, these were chosen for illustration purposes only. The invention is not limited to use with thiolated PEG molecules. Because the invention produces stable colloidal gold nanoparticles for bio-conjugation, any ligand having a group that can bind to AuNP surfaces can be used such as thiol, disulfide, phosphine, amine, azide, methyl or carboxyl groups. This also makes colloidal gold nanoparticles prepared according to the present invention very attractive for use in binding aptamers and other rare or expensive ligands. The aptamers can be deoxyribonucleic acid (DNA) or ribonucleic acid (RNA) or amino acid sequences as is known in the art. The present colloidal gold can also be used to bind to antibodies, enzymes, proteins, peptides and other reporter or ligand materials that are rare or expensive. The ligands can include any fluorescent marker having a group or bound to a group that can be conjugated to AuNP. In addition, all kinds of PEG molecules, comprising mono-, homo-, and heterofunctional PEG with different functional groups and one or multiple arms and molecular weights ranging from 200 to 1,000,000 can also be used for the surface modification reaction. In the case of using hetero functional PEG, the functional groups, for example a carboxyl group COOH and an amine group NH2 could be used for binding to other functional groups on other ligands. The present invention opens a wide range of possibilities for other functionalities to be added to the AuNPs as well as other PMNPs. Examples of polymers other than PEG that can be used include, hydrocarbon, polyacrylamide, polydecylmethacrylate, polymethacrylate, polystyrene, dendrimer molecules, polycaprolactone (PCL), polylactic acid (PLA), poly(lactic-co-glycolic acid) (PLGA), polyglycolic acid (PGA), polyhydroxybutyrate (PHB), and other organic chain molecule. Also, a copolymer which comprises at least one of the above listed polymers is in the scope. Although a lower conductivity such as lower than 25 µS/cm is beneficial regarding the stability during bioconjugation, higher conductivity beyond 25 µS/cm may be required for different reasons in some bioconjugation reactions. For example, S. J. Hurst et al. in"Maximizing DNA Loading on a Range of Gold Nanoparticle Sizes", *Anal. Chem.* 2006, 78, 8313-8318, proposed to increase the salt concentration in AuNCs to maximize DNA loading on AuNP utilizing the ability of NaCl to enhance the DNA loading on the surface. Notwithstanding that the preferred conductivity of the PMNCs is less than 25 µS/cm, in certain embodiments of the present invention increasing conductivity beyond 25 µS/cm prior to or during mixing the PMNCs with bio-molecules such as DNA can be beneficial as a part of a bio-conjugation reaction. As long as the stability is maintained during the bio-conjugation, the conductivity can be increased as high as possible, especially when the nanoparticles have attained stabilizing mechanism enough for the colloids to be stable, which can be achieved, for example, by conjugating with the minimum amount of bio-molecules.

Another effect of the present invention is long-term stability of the colloids owing to the well-controlled and suppressed increase of conductivity. Even though initial electrolyte concentration is very small when prepared, the colloidal system becomes unstable with time during storage because the relevant ions continue to come out from the surface of the container. As shown in FIG. 4, time evolution of the externally introduced electrolyte amount may be estimated by monitoring conductivity, as such, it can be predetermined.

For purposes of summarizing the present invention, certain aspects, advantages and novel features of the present invention are described herein. It is understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

While only certain embodiments have been specifically described herein, it will be apparent that numerous modifications may be made thereto without departing from the spirit and scope of the invention. Further, the described embodiments are not mutually exclusive, and elements, components, materials, or steps described in connection with one exemplary embodiment may be combined with, or eliminated from, other embodiments in suitable ways to accomplish desired design objectives.

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, acronyms are used merely to enhance the readability of the specification and claims. It should be noted that these acronyms are not intended to lessen the generality of the terms used and they should not be construed to restrict the scope of the claims to the embodiments described therein.

It will be further understood that various changes in the details, materials, and arrangements of the parts which have been described and illustrated in order to explain the nature of described embodiments may be made by those skilled in the art without departing from the scope as expressed in the following claims.

FURTHER EXAMPLES AND EMBODIMENTS

The Invention May be Related to One or More of the Following Examples

1. A colloidal suspension comprising;
    precious metal nanoparticles having a concentration of more than 0.01 nM in a liquid including electrolyte,
    wherein the colloidal suspension has an electrical conductivity of 25 µS/cm or less.
2. The colloidal suspension of example 1 wherein the electrical conductivity of the colloidal suspension is greater than 1.5 µS/cm and less than 15 µS/cm.
3. The colloidal suspension of example 1 wherein the colloidal suspension is enclosed in a storage container, wherein a material of the storage container in contact with the colloidal suspension is polymer or plastic.
4. The colloidal suspension of example 3 wherein the polymer or plastic is polycarbonate, polyethylene, polyethylene terephthalate, polyethylene terephthalate glycol-modified, and polystyrene.
5. The colloidal suspension of example 3 wherein an increase of the electrical conductivity of the colloidal suspension in the storage container is less than 1.5 µS/cm per week.
6. The colloidal suspension of example 1 wherein the precious metal is selected from the group consisting of gold, silver, copper, platinum, palladium, rhodium, ruthenium, iridium, osmium, and an alloy including at least one of said precious metal.
7. The colloidal suspension of example 1 wherein the precious metal nanoparticles have a particle diameter in a range of about 1 to 1000 nm.
8. The colloidal suspension of example 1 wherein the electrolyte includes water and at least one salt.
9. The colloidal suspension of example 8 wherein the salt includes at least one element selected from the group consisting of Group 1 elements in the Periodic Table, Group 2 elements in the Periodic Table, Group 15 elements in the Periodic Table, Group 16 elements in the Periodic Table, and Group 17 elements in the Periodic Table
10. The colloidal suspension of example 1 wherein the concentration of the precious metal nanoparticles is more than 0.1 nM.
11. A method of making a colloidal solution comprising the steps of:
    providing a liquid having an electrical conductivity;
    adjusting the electrical conductivity of the liquid to be within a desired range;
    providing nanoparticles in a container; and
    combining the nanoparticles with the adjusted liquid in the container to form the colloidal solution that has a nanoparticle concentration of at least 0.01 nM.
12. The method of example 11 wherein the step of the providing the nanoparticles comprising the steps of:
    transferring the adjusted liquid to the container, the container having a target therein;
    irradiating the target with laser light pulses to form nanoparticles.
13. The method of example 11 wherein the step of adjusting the electrical conductivity of the liquid comprises the steps of:
    adding an electrolyte solution to the liquid if the electrical conductivity is less than the desired range; and
    adding water or a highly-dilute electrolyte to the liquid if the electrical conductivity is greater than the desired range.
14. The method of example 11 wherein the desired range is approximately 1 µS/cm to approximately 25 µS/cm.
15. The method of example 11 wherein the desired range is from 1 µS/cm to 10 µS/cm.
16. The method of example 11 wherein the steps thereof are a continuous process.
17. The method of example 11 wherein the steps thereof are a batch process.
18. The method of example 11 further comprising a step of refining a size distribution of the precious metal nanoparticles in the colloidal suspension.
19. The method of example 18 wherein the step of the refining the size distribution is carried out by centrifugation.
20. The method of example 11, further comprising a step of storing the colloidal suspension in a storage container.
21. The method of example 20, further comprising a step of monitoring the electrical conductivity of the stored colloidal suspension and, if required, adding an electrolyte solution to the liquid if the electrical conductivity is less than the desired range; and adding water or a highly-dilute electrolyte to the liquid if the electrical conductivity is greater than the desired range.
22. The method of example 12 wherein the target is a bulk precious metal target.
23. The method of example 22 wherein at least a portion of the bulk precious metal target material is in contact with the liquid.
24. The method of example 12 wherein the target is a wire-shaped precious metal target.
25. The method of example 24 wherein at least a portion of the wire-shaped precious metal target material is in contact with the liquid.
26. The method of example 12 wherein the precious metal nanoparticles have a particle diameter in a range of about 1 to 1000 nm.
27. The method of example 12 wherein the laser light pulses have a repetition rate in the range from 1 kHz to 100 MHz.
28. The method of example 12 wherein the laser light pulses have pulse energy in the range from 10 nJ to 2 mJ.

29. The method of example 12 wherein the laser light pulses have a center of wavelength at an ultraviolet, visible, or near infrared wavelength.

30. The method of example 12 wherein the laser light pulses have pulse duration in the range from 10 fs to 100 ns.

31. A method of making a colloidal suspension comprising the steps of:
providing precious metal nanoparticles;
combining the precious metal nanoparticles with a liquid to form a colloidal suspension;
purifying the colloidal suspension to decrease a total ion concentration in the colloidal solution;
monitoring an electrical conductivity of the colloidal suspension; and
adjusting, if required, the electrical conductivity of the colloidal suspension to be within a desired range.

32. The method of example 31 wherein the step of the purifying the colloidal suspension comprising the steps of:
centrifuging the colloidal suspension;
removing a supernatant of the centrifugal colloidal suspension to reduce a total amount of electrolyte ions;
adding a highly-dilute electrolyte solution to a precipitate of the centrifugal colloidal suspension; and
mixing the precipitate of the centrifugal colloidal suspension with the highly-dilute electrolyte solution.

33. The method of example 32 wherein the mixing step comprises the step of vortexing the centrifugal colloidal suspension with the highly-dilute electrolyte solution.

34. The method of example 31 further comprising a step of storing the colloidal suspension in a storage container.

35. The method of example 34 further comprising a step of monitoring the electrical conductivity of the stored colloidal suspension and, if required, adding an electrolyte solution to the liquid if the electrical conductivity is less than the desired range; and adding water or a highly-dilute electrolyte to the liquid if the electrical conductivity is greater than the desired range.

36. The method of example 31 further comprising a step of bioconjugating using the colloidal suspension.

37. The method of example 31 wherein the step of the adjusting the electrical conductivity of the liquid comprises the steps of:
adding an electrolyte solution to the liquid if the electrical conductivity is less than the desired range; and
adding a highly-diluted electrolyte solution or water to the liquid if the electrical conductivity is greater than the desired range.

38. The method of example 31 wherein the desired range is approximately 1 µS/cm to approximately 25 µS/cm.

39. The method of example 31 wherein the desired range is from 1 µS/cm to 10 µS/cm.

40. The method of example 34 wherein the precious metal nanoparticles have a particle diameter in a range of about 1 to 1000 nm.

41. An apparatus comprising:
a source of a liquid having an electrical conductivity;
an electrical conductivity adjusting system receiving the liquid from the source and configured to adjust the electrical conductivity of the liquid;
a container configured to receive the adjusted electrical conductivity liquid from the electrical conductivity adjusting system at an inlet and configured to produce a colloidal suspension at an outlet;
an electrical conductivity monitoring device placed in the container proximate the inlet;
wherein the electrical conductivity adjusting system, in response to the electrical conductivity monitoring device, is configured to maintain the electrical conductivity of the liquid within a desired range.

42. The apparatus of example 41 further comprising:
a source of nanoparticles,
wherein the container is configured to receive the nanoparticles and the nanoparticles, when combined with the liquid, forms the colloidal suspension.

43. The apparatus of example 41 further comprises:
a holder, disposed in the container, configured to receive a precious metal target;
a laser system configured to produce laser light pulses directed at the target;
wherein the laser light pulses, upon striking the target, produces nanoparticles and the nanoparticles, when combined with the liquid, forms the colloidal suspension.

44. The system of example 43 wherein the precious metal target is a bulk precious metal target having a flat surface.

45. The system of example 44 wherein both the bulk precious metal target and the holder are configured to be submerged below the surface of the liquid.

46. The apparatus of example 41 wherein the electrical conductivity adjusting system comprises:
an additional electrical conductivity monitoring device located between the source of the liquid and the electrical conductivity adjusting system,
wherein the electrical conductivity adjusting system is additionally responsive to the additional electrical conductivity monitoring device.

47. The system of example 41 wherein the container is attached to a motion stage that produces a translational motion.

48. The system of example 41 further comprising:
a precious metal wire disposed in the container; and
a laser system configured to produce laser light pulses directed at the precious metal wire,
wherein the head of the precious metal wire is maintained in a focal volume of the laser light pulses,
wherein the laser light pulses, upon striking the precious metal wire, produces nanoparticles and the nanoparticles, when combined with the liquid, forms the colloidal suspension.

49. The system of example 43 or 48 further comprising a lens configured to focus the laser light pulses.

50. The system of example 49 wherein the lens is a f-theta lens.

51. The system of example 43 or 48 further comprising a guide mechanism configured to guide the laser light pulses onto the precious metal target.

52. The system of example 51 wherein the guide mechanism is a vibration mirror configured to have a vibration frequency of 10 Hz or greater and an angular amplitude of 1 mrad or greater, and provide a laser beam scanning speed on the surface of the target is 0.01 m/s or greater.

53. The system of example 52 wherein the vibration mirror is a piezo-driven mirror.

54. The system of example 52 wherein the vibration mirror is a galvanometer mirror.

55. The system of example 43 or 48 further comprising a stirring bar disposed in the container proximate the electrical conductivity monitoring device.

56. The system of example 43 or 48 wherein the generated laser light pulses have a repetition rate in the range from 1 kHz to 100 MHz.

57. The system of example 43 or 48 wherein the generated laser light pulses have pulse energy in the range from 10 nJ to 2 mJ.

58. The system of example 43 or 48 wherein the generated laser light pulses have a center of wavelength at an ultraviolet, visible, or near infrared wavelength.

59. The system of example 43 or 48 wherein the generated laser light pulses have pulse duration in the range from 10 fs to 100 ns.

60. The system of example 43 or 48 wherein the precious metal nanoparticles have a particle diameter in a range of about 1 to 1000 nm.

61. The system of example 43 or 48 wherein the liquid includes an electrolyte.

62. The system of example 61 wherein the electrolyte includes at least one salt.

63. The system of example 62 wherein the salt includes at least one element selected from the group consisting of Group 1 elements in the Periodic Table, Group 2 elements in the Periodic Table, Group 15 elements in the Periodic Table, Group 16 elements in the Periodic Table, and Group 17 elements in the Periodic Table.

We claim:

1. A colloidal suspension comprising;
precious metal nanoparticles selected from the group consisting of gold, silver, copper, platinum, palladium, rhodium, ruthenium, iridium, osmium, and an alloy including at least one of said precious metals, said nanoparticles having a size distribution including a single peak and a size range of from about 1 to 100 nm, said nanoparticles being at a molar particle concentration of more than 0.01 nM in a suspension liquid, said suspension liquid being free from any nanoparticle dispersants, stabilizing agents, or surfactants that cause steric repulsion between said nanoparticles other than at least one added predetermined electrolyte, said added predetermined electrolyte consisting essentially of at least one anion or cation formed with an element selected from the group consisting of the alkali metal elements from Group 1 of the Periodic Table, the alkaline earth metal elements from Group 2 of the Periodic Table, and the halide elements from Group 17 of the Periodic Table, wherein an electrical conductivity of said suspension liquid is stabilized by the addition of said predetermined electrolyte, and
wherein the amount of the predetermined electrolyte added is selected to cause the colloidal suspension to have an initial electrical conductivity of from greater than 2.0 to 25 µS/cm and wherein an increase of said electrical conductivity of said colloidal suspension over time is less than 1.5 µS/cm per week.

2. The colloidal suspension of claim 1 wherein the initial electrical conductivity of the colloidal suspension is greater than 2.0 µS/cm and less than 15 µS/cm.

3. The colloidal suspension of claim 1 wherein the colloidal suspension is enclosed in a storage container, wherein a material of the storage container in contact with the colloidal suspension is a polymer or a plastic selected from the group consisting of polycarbonate, polyethylene, polyethylene terephthalate, and polyethylene terephthalate glycol-modified.

4. The colloidal suspension of claim 1 wherein the precious metal nanoparticles have a particle diameter in a range of about 10 to 100 nm.

5. The colloidal suspension of claim 1 wherein the electrolyte includes water and at least one salt.

6. The colloidal suspension of claim 1, wherein the concentration of the precious metal nanoparticles is more than 0.1 nM.

7. The colloidal suspension of claim 1, wherein the precious metal is gold, silver, copper, or an alloy including at least one of said precious metals.

8. The colloidal suspension of claim 1 made by a Pulsed Laser Ablation in Liquid (PLAL) method in which high repetition rate laser pulses generate Precious Metal Nano-Particles (PMNPs) in a liquid.

9. The colloidal suspension according to claim 1, wherein the colloidal suspension is stable, meaning the absorbance at 520 nm is +/−15% of the value of the colloidal suspension as initially prepared.

10. A method of bio-conjugation of the colloidal suspension according to claim 1, said method comprising:
receiving a colloidal suspension of precious metal nanoparticles in a dispersion medium according to claim 1;
monitoring an electric conductivity of said colloidal suspension with one or more conductivity monitoring devices and, if required, adjusting the electric conductivity of the dispersion medium to be 25 µS/cm or less; and
performing a bio-conjugation of said nanoparticles with bio-molecules by mixing said colloidal suspension with said bio-molecules so that at least a portion of said bio-molecules attach to said precious metal nanoparticles.

11. The method of claim 10, wherein said colloidal suspension comprises precious metal nanoparticles at a concentration of more than 0.01 nM; and a dispersion medium comprising water and electrolyte.

12. The method of claim 10, wherein said colloidal suspension is made by a Pulsed Laser Ablation in Liquid (PLAL) process.

13. A method of making a colloidal suspension according to claim 1, said method for bio-conjugation, the method comprising the steps of:
providing a target material comprising a precious metal and a liquid containing deionized water and electrolyte as a dispersion medium in an ablation container;
monitoring an electric conductivity of the dispersion medium with one or more conductivity monitoring devices and, if required, adjusting the electric conductivity of the dispersion medium by a conductivity adjustment system to be 25 µS/cm or less;
generating precious metal nanoparticles by delivering laser pulses to the target material there by ablating the target material and forming a colloidal suspension of the precious metal nanoparticles and adjusting the colloidal suspension to contain at least 0.01 nM of the precious metal nanoparticles.

14. The method of claim 10, wherein said colloidal suspension is made with a chemical synthesis method.

15. The method of claim 10, further comprising: increasing the conductivity in the colloidal suspension to higher than 25 µS/cm subsequent to said monitoring and adjusting, or during said step of performing bioconjugation.

16. The method of claim 10, wherein said adjusting is carried out with a conductivity adjustment system.

17. The method of claim 10, wherein said bio-conjugation includes surface functionalization of said nanoparticles with bio-molecules, including at least one functional group selected from the group consisting of thiol, disulfide, phosphine, amine, azide, methyl, and carboxyl.

18. The method of claim 17, wherein the biomolecule comprises an organic chain molecule.

19. The method of claim 17, wherein the bio-molecules have a molecular weight larger than 200 g/mol.

20. The method of claim 17, wherein the bio-molecules have a molecular weight larger than 8500 g/mol.

21. The method of claim 10, wherein the precious metal nanoparticles have an average particle diameter in a range of about 10 to 100 nm.

22. The method of claim 10, wherein said electrical conductivity is determined at least at or near a time when said bio-conjugation is initiated.

23. A method of making a colloidal solution according to claim 1, said method comprising the steps of:
  providing a liquid having an electrical conductivity;
  adjusting the electrical conductivity of the liquid to be less than 25 µS/cm providing nanoparticles in a container; and
  combining the nanoparticles with the adjusted liquid in the container to form the colloidal solution that has a nanoparticle concentration of at least 0.01 nM.

24. A method of making a colloidal suspension according to claim 1, said method comprising the steps of:
  providing precious metal nanoparticles;
  combining the precious metal nanoparticles with a liquid to form a colloidal suspension;
  purifying the colloidal suspension to decrease a total ion concentration in the colloidal solution to be 25 µS/cm or less;
  monitoring an electrical conductivity of the colloidal suspension; and
adjusting, if required, the electrical conductivity of the colloidal suspension to be less than 25 µS/cm.

25. The method of claim 12, wherein said colloidal suspension is made with the PLAL method according to claim 13.

* * * * *